US012574292B2

(12) United States Patent
Ramachandran et al.

(10) Patent No.: US 12,574,292 B2
(45) Date of Patent: Mar. 10, 2026

(54) AUTONOMOUS TOPOLOGY REALIZATION FOR TILT CONTROL IN AN OPTICAL SEGMENT

(71) Applicant: Infinera Corp., San Jose, CA (US)

(72) Inventors: Sanjeev Ramachandran, Manipal (IN); António Eira, Amadora (PT)

(73) Assignee: Infinera Corp.

( * ) Notice: Subject to any disclaimer, the term of this patent is extended or adjusted under 35 U.S.C. 154(b) by 315 days.

(21) Appl. No.: 18/417,843

(22) Filed: Jan. 19, 2024

(65) Prior Publication Data

US 2024/0250881 A1 Jul. 25, 2024

Related U.S. Application Data

(60) Provisional application No. 63/439,896, filed on Jan. 19, 2023.

(51) Int. Cl.
| | |
|---|---|
| *H04B 10/02* | (2006.01) |
| *H04J 14/08* | (2006.01) |
| *H04L 41/12* | (2022.01) |
| *H04Q 11/00* | (2006.01) |

(52) U.S. Cl.
CPC ............. *H04L 41/12* (2013.01); *H04J 14/08* (2013.01); *H04Q 11/0062* (2013.01); *H04J 2203/0055* (2013.01); *H04J 2203/006* (2013.01); *H04J 2203/0071* (2013.01); *H04Q 2011/009* (2013.01)

(58) Field of Classification Search
CPC .............. H04B 10/077; H04B 10/0797; H04B 10/07955; H04B 10/0795; H04B 10/0793;

H04J 14/02; H04J 14/021; H04J 14/0212; H04J 14/0202; H04J 14/0272; H04Q 11/0062; H04Q 11/0067; H04Q 11/0066
USPC ... 398/173, 177, 181, 79, 83, 158, 159, 160, 398/33, 38, 30, 31, 32, 25, 26, 27, 45, 48, 398/49, 34, 37; 359/337, 337.11, 341, 359/341.41, 341.42
See application file for complete search history.

(56) References Cited

U.S. PATENT DOCUMENTS

| | | | | | |
|---|---|---|---|---|---|
| 8,086,106 | B2 * | 12/2011 | Nakamura | ......... | H04B 10/2939 398/79 |
| 11,870,553 | B2 * | 1/2024 | Hasegawa | ........... | G02B 6/4286 |
| 2023/0224039 | A1 * | 7/2023 | Ramachandran | .. | H04Q 11/0062 398/141 |

* cited by examiner

*Primary Examiner* — Hanh Phan

(57) ABSTRACT

Optical networks, network elements, and methods of use are described herein, including an optical network comprising head-end and tail-end network elements, an optical multiplex section (OMS) connecting the head-end and tail-end network elements, and one or more intermediate line amplifiers in the OMS between the head-end and tail-end network elements. The head-end network element may store first information indicative of a first tilt control section having the head-end and tail-end network elements as endpoints; determine information indicative of a change in topology of the OMS, such as that a first intermediate line amplifier has switched from a non-monitoring to a monitoring mode; and store second information indicative of a second tilt control section having the head-end network element and a new tail-end network element, such as the first intermediate line amplifier.

20 Claims, 10 Drawing Sheets

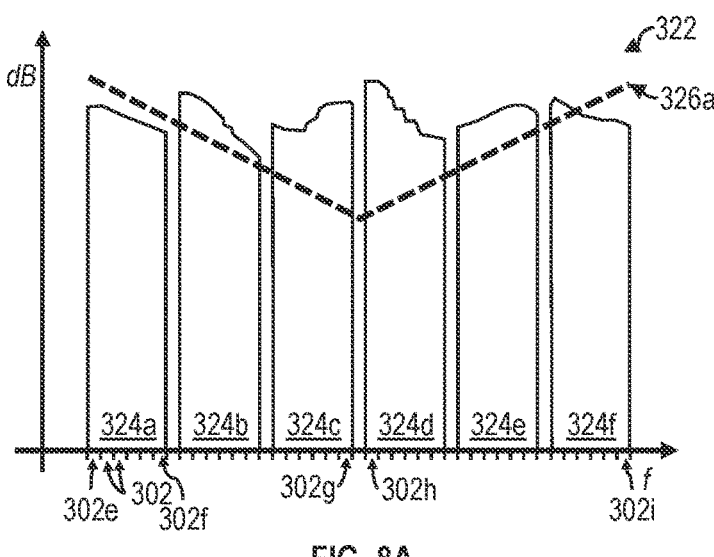
FIG. 8A
FIG. 8B
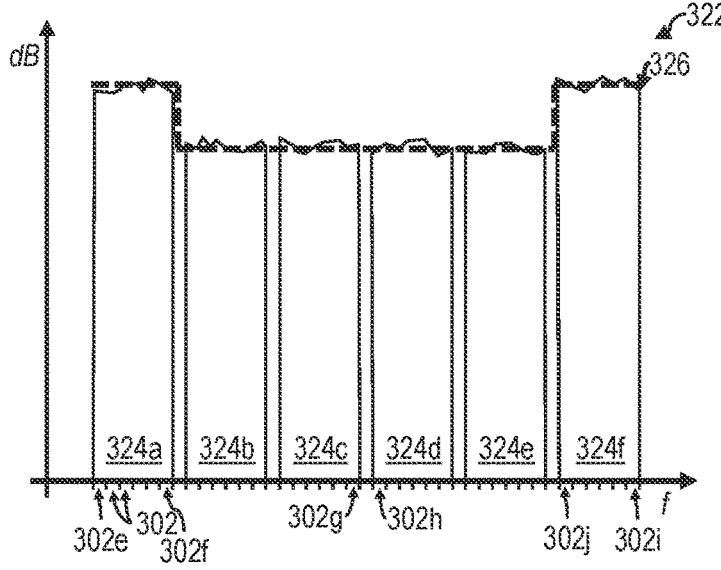
FIG. 8C

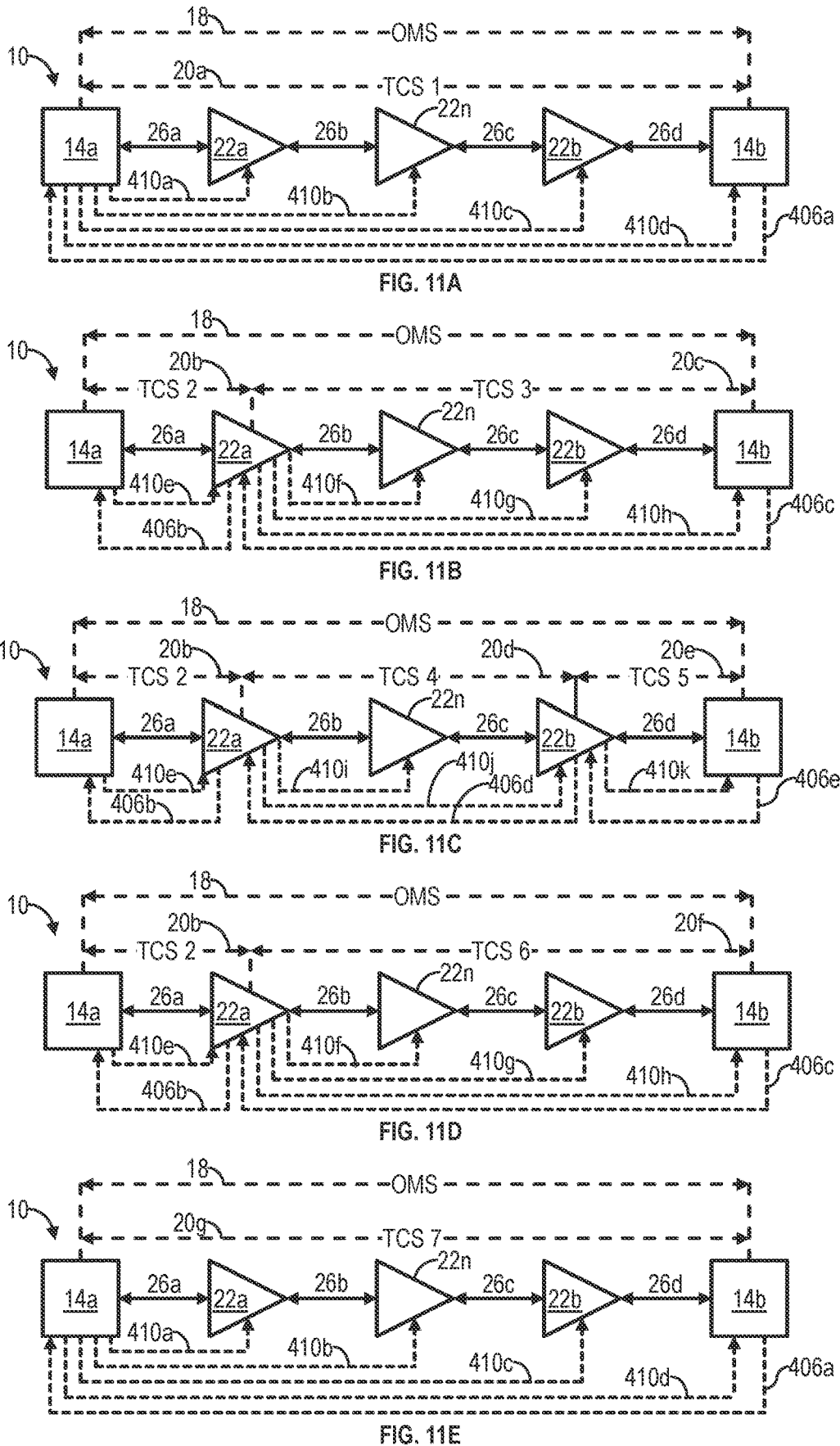

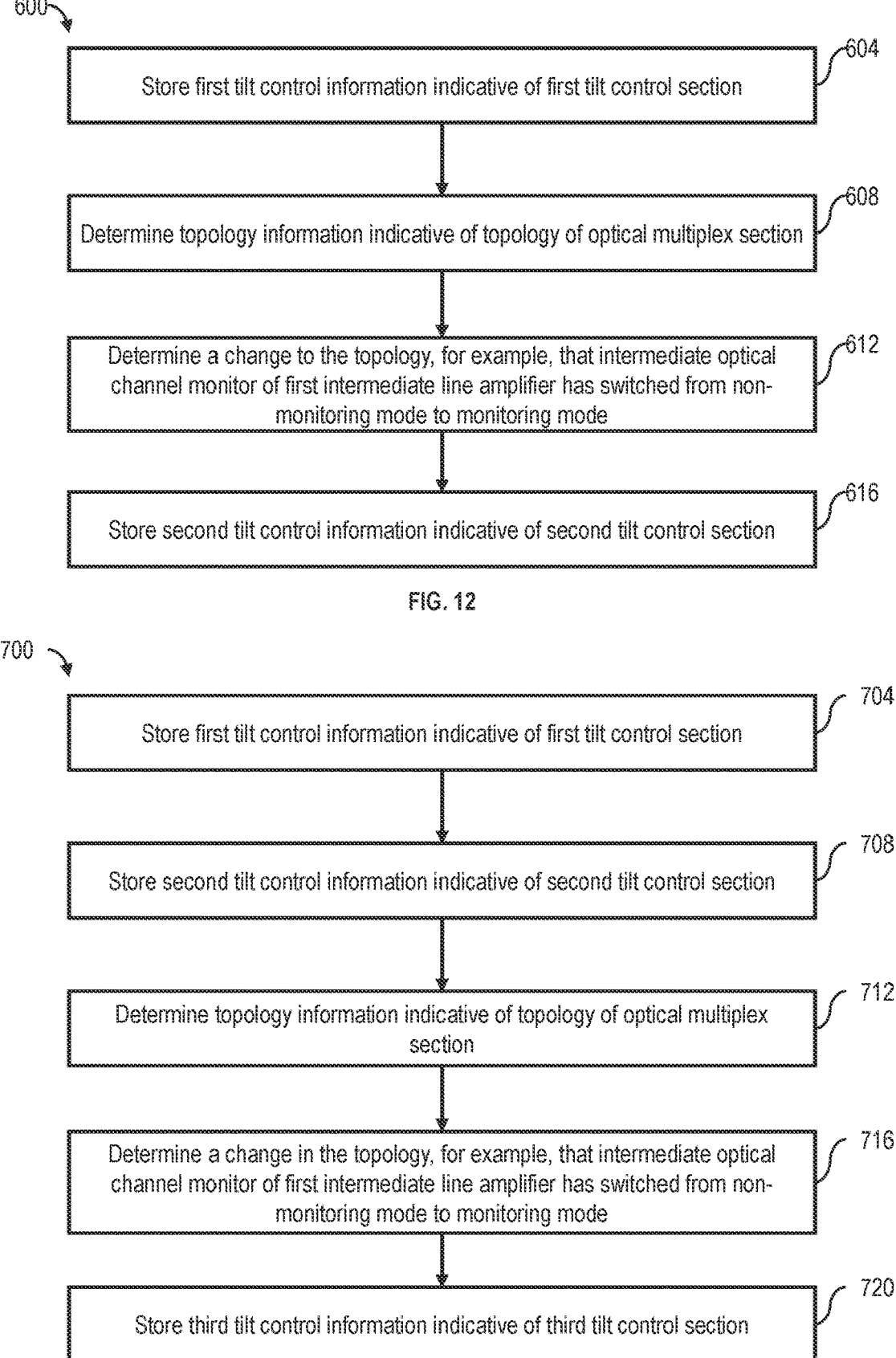

600

| | |
|---|---|
| Store first tilt control information indicative of first tilt control section | 604 |
| Determine topology information indicative of topology of optical multiplex section | 608 |
| Determine a change to the topology, for example, that intermediate optical channel monitor of first intermediate line amplifier has switched from non-monitoring mode to monitoring mode | 612 |
| Store second tilt control information indicative of second tilt control section | 616 |

| | |
|---|---|
| Store first tilt control information indicative of first tilt control section | 704 |
| Store second tilt control information indicative of second tilt control section | 708 |
| Determine topology information indicative of topology of optical multiplex section | 712 |
| Determine a change in the topology, for example, that intermediate optical channel monitor of first intermediate line amplifier has switched from non-monitoring mode to monitoring mode | 716 |
| Store third tilt control information indicative of third tilt control section | 720 |

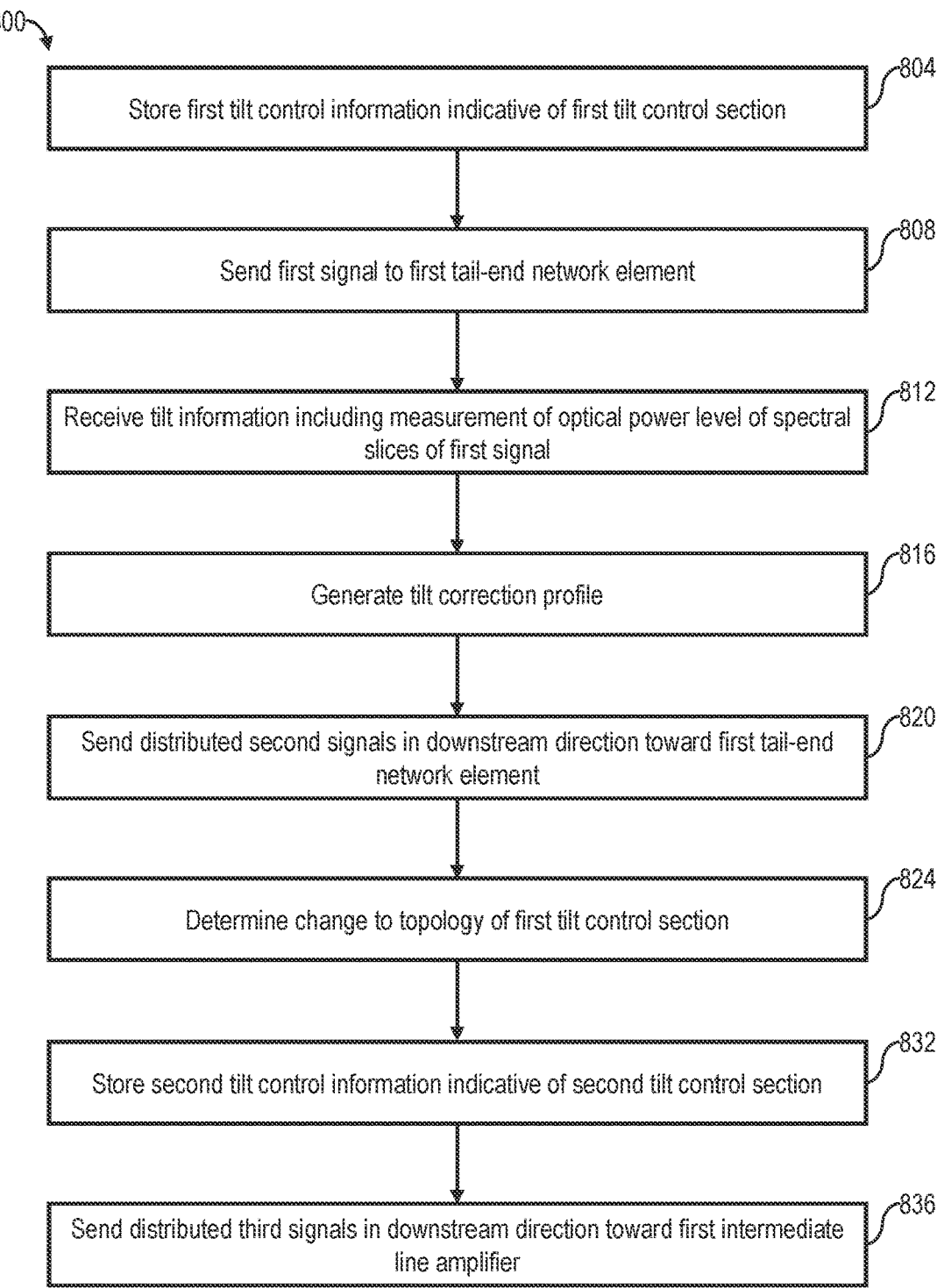

804
Store first tilt control information indicative of first tilt control section 808
Send first signal to first tail-end network element 812
Receive tilt information including measurement of optical power level of spectral slices of first signal 816
Generate tilt correction profile 820
Send distributed second signals in downstream direction toward first tail-end network element 824
Determine change to topology of first tilt control section 832
Store second tilt control information indicative of second tilt control section 836
Send distributed third signals in downstream direction toward first intermediate line amplifier

FIG. 14

AUTONOMOUS TOPOLOGY REALIZATION FOR TILT CONTROL IN AN OPTICAL SEGMENT

CROSS-REFERENCE TO RELATED APPLICATIONS

This application claims priority to the provisional patent application identified by U.S. Ser. No. 63/439,896, filed Jan. 19, 2023, the entire content of which is hereby expressly incorporated herein by reference.

BACKGROUND ART

Optical networking is a communication means that utilizes signals encoded in light to transmit information (e.g., data) as an optical signal in various types of telecommunications networks. Optical networking may be used in relatively short-range networking applications such as in a local area network (LAN) or in long-range networking applications spanning countries, continents, and oceans. Generally, optical networks utilize optical amplifiers, a light source such as lasers or LEDs, and wavelength division multiplexing to enable high-bandwidth communication.

Optical networks are a critical component of the global Internet backbone. This infrastructure acts as the underlay, providing the plumbing for all other communications to take place (e.g., access, metro, and long-haul). In the traditional 7-layer OSI model, Optical networks constitute the Layer 1 functions, providing digital transmission of bit streams transparently across varying distances over a chosen physical media (in this case, optical). Optical networks also encompass an entire class of devices (which are referred to as Layer 0), which purely deal with optical photonic transmission and wavelength division multiplexing (WDM). This includes amplification, (re-) generation, and optical add/drop multiplexing (OADM). The most widely adopted Layer 1/Layer 0 transport networking technologies today, referred to as Optical Transport Networks (OTN), are based on ITU-T standards. Both these classes of networks are connection-oriented and circuit-switched in nature.

Dense Wavelength Division Multiplexing (DWDM) is an optical transmission technology that uses a single optical fiber line to simultaneously transport multiple optical services of different wavelengths. The different wavelengths are conventionally separated into several frequency bands, each frequency band being used as an independent channel to transport optical services of particular wavelengths. The Conventional Band (C-band) typically includes signals with wavelengths ranging from 1530 nm to 1565 nm, is the frequency band in which optical services experience the lowest amount of loss, and is the band most commonly used in DWDM. The Long-wavelength Band (L-band), which typically includes signals with wavelengths ranging from 1565 nm to 1625 nm, is the frequency band in which optical services experience the second lowest amount of loss, and is the frequency band often used when the C-band is insufficient to meet bandwidth requirements. Optical line systems that use both the C-band and the L-band are referred to as C+L or C/L optical line systems.

A persistent challenge in the field of optical networking is the detection and correction of channel tilt, a phenomenon in which optical channels of different wavelengths within an optical signal experience varying degrees of gain or loss as the optical signal travels through optical multiplex sections (OMSs). Tilt can significantly degrade signal quality and limit system performance. To address the issue of tilt, various tilt correction techniques have been developed. These techniques typically involve dynamically adjusting amplifier gains or employing specialized filters to achieve a flat frequency response across all optical channels.

Conventionally, tilt correction has been implemented within fixed tilt control sections (TCSs) defined by the location of amplifiers equipped with an optical channel monitor (OCM), which provides information about individual optical channel power levels and signal quality within the OMS. However, it is possible that the topology of the OMS may change while the OMS is currently carrying traffic. For example, amplifiers may be installed or uninstalled while the OMS is currently carrying traffic, or amplifiers at intermediate nodes within the OMS may be installed with an OCM, but monitoring by the OCM is enabled or disabled when the OMS is currently carrying traffic.

Accordingly, there is a need for a tilt correction system that can adapt to the changing topology of the OMS.

SUMMARY OF THE INVENTION

Optical transport networks, network elements, and methods of use are disclosed herein.

In some implementations, the problem of providing a tilt correction system that can adapt to the changing topology of the optical multiplex section is solved by an optical network, which may comprise: a head-end network element having a head-end processor, a head-end non-transitory processor-readable medium storing head-end processor-executable instructions, and a head-end optical channel monitor; a tail-end network element having a tail-end processor, a tail-end non-transitory processor-readable medium storing tail-end processor-executable instructions, and a tail-end optical channel monitor; an optical multiplex section connecting the head-end network element and the tail-end network element; and one or more intermediate line amplifiers in the optical multiplex section between the head-end network element and the tail-end network element, at least one of the one or more intermediate line amplifiers having an intermediate optical channel monitor. The head-end processor-executable instructions, when executed by the head-end processor, may cause the head-end processor to carry out the processor-executable instructions, which may cause the processor to: store first tilt control information indicative of a first tilt control section having the head-end network element as a first upstream endpoint and the tail-end network element as a first downstream endpoint; determine topology information indicative of a topology of the optical multiplex section, the topology information including line amplifier information indicative of an operational status of the one or more intermediate line amplifiers; determine, based on the operational status of the one or more intermediate line amplifiers, that the intermediate optical channel monitor of a first intermediate line amplifier of the one or more intermediate line amplifiers has switched from a non-monitoring mode to a monitoring mode; and store second tilt control information indicative of a second tilt control section having the head-end network element as a second upstream endpoint and the first intermediate line amplifier as a second downstream endpoint.

In some implementations, the problem of providing a tilt correction system that can adapt to the changing topology of the optical multiplex section is solved by an optical network which may comprise: a head-end network element having a head-end processor, a head-end non-transitory processor-readable medium storing head-end processor-executable instructions, and a head-end optical channel monitor; a tail-end network element having a tail-end processor, a tail-end non-transitory processor-readable medium storing tail-end processor-executable instructions, and a tail-end optical channel monitor; an optical multiplex section connecting the head-end network element and the tail-end network element; and one or more intermediate line amplifiers in the optical multiplex section between the head-end network element and the tail-end network element, a first intermediate line amplifier of the one or more intermediate line amplifiers having an intermediate optical channel monitor. The head-end processor-executable instructions, when executed by the head-end processor, may cause the head-end processor to: store first tilt control information indicative of a first tilt control section having the head-end network element as a first upstream endpoint and the first intermediate line amplifier as a first downstream endpoint; store second tilt control information indicative of a second tilt control section having the first intermediate line amplifier as a second upstream endpoint and the tail-end network element as a second downstream endpoint; determine topology information indicative of a topology of the optical multiplex section, the topology information including line amplifier information indicative of an operational status of the one or more intermediate line amplifiers; determine, based on the operational status of the one or more intermediate line amplifiers, that the intermediate optical channel monitor of the first intermediate line amplifier has switched from a monitoring mode to a non-monitoring mode; and store third tilt control information indicative of a third tilt control section having the head-end network element as a third upstream endpoint and the tail-end network element as a third downstream endpoint.

In some implementations, the problem of providing a tilt correction system that can adapt to the changing topology of the optical multiplex section is solved by a network element in an optical network which may comprise: a head-end processor and a head-end non-transitory processor-readable medium storing head-end processor-executable instructions that when executed cause the head-end processor to: store tilt control information indicative of a first tilt control section having the network element as a head-end network element acting as an upstream endpoint and a first tail-end network element acting as a downstream endpoint, the first tilt control section having a first number of network elements between the head-end network element and the first tail-end network element; send a first signal to the first tail-end network element, the first signal having a plurality of spectral slices, each of the plurality of spectral slices having an optical power level; receive, from the first tail-end network element, tilt information including a measurement of the optical power level of each of the plurality of spectral slices of the first signal, thereby determining a tilt of the first signal; generate, based on the tilt information, a tilt correction profile, the tilt correction profile including an amount of amplification or attenuation configured to be applied to each of the plurality of spectral slices of the first signal to correct the tilt of the first signal; send one or more distributed second signals in a downstream direction toward the first tail-end network element, each of the one or more distributed second signals configured to be received by one of the first number of network elements of the first tilt control section, the one or more distributed second signals including a first number of distributed tilt correction profiles corresponding to the first number of network elements, each of the first number of distributed tilt correction profiles including a portion of the amount of amplification or attenuation configured to be applied to each of the plurality of spectral slices of the first signal to correct the tilt of the first signal; determine a change to a topology of the first tilt control section; store second tilt control information indicative of a second tilt control section having a second tail-end network element different from the first tail-end network element and having a second number of network elements between the head-end network element and the second tail-end network element; send one or more distributed third signals in a downstream direction toward the second tail-end network element, each of the one or more distributed third signals configured to be received by only the second number of network elements between the head-end network element and the second tail-end network element, the one or more distributed third signals including a second number of distributed tilt correction profiles, each of the second number of distributed tilt correction profiles including a portion of the amount of amplification or attenuation configured to be applied to each of the plurality of spectral slices of the first signal to correct the tilt of the first signal.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings:

FIGS. 8A and 8B are diagrammatic views of exemplary implementations of an optical carrier in accordance with the present disclosure.

FIG. 8C is a diagrammatic view of an exemplary implementation of the optical carrier of FIG. 8A having a different target power profile in accordance with the present disclosure.

FIGS. 11A, 11B, 11C, 11D, and 11E are diagrammatic views of the optical transport network shown in FIG. 1 at various stages of the methods shown in FIGS. 9 and 10.

FIG. 12 is a diagrammatic view of another exemplary method of autonomous topology realization for tilt control in accordance with the present disclosure.

FIG. 13 is a diagrammatic view of another exemplary method of autonomous topology realization for tilt control in accordance with the present disclosure.

FIG. 14 is a diagrammatic view of another exemplary method of autonomous topology realization for tilt control in accordance with the present disclosure.

DETAILED DESCRIPTION

Figure 1:
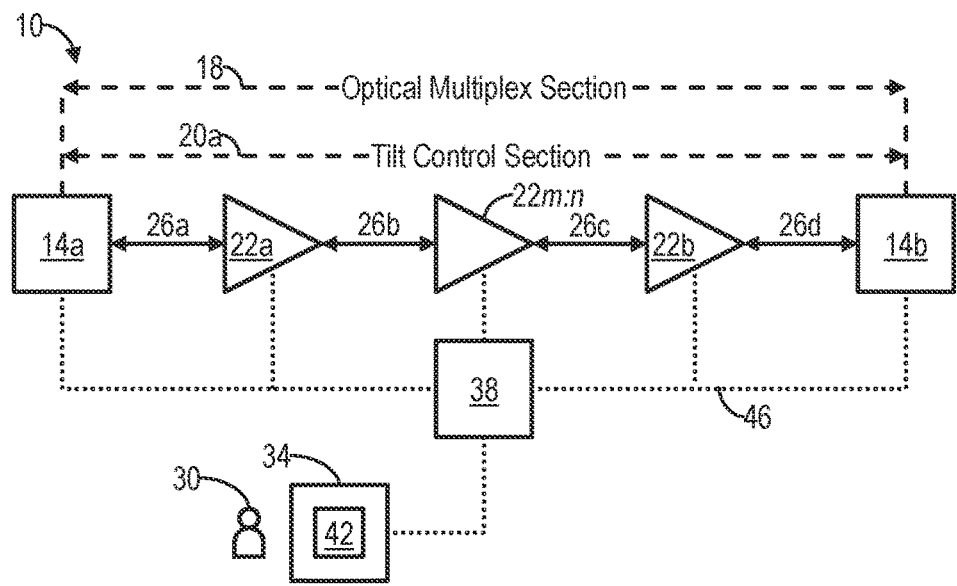
FIG. 1 is a diagrammatic view of an exemplary implementation of an optical transport network constructed in accordance with one implementation of the present disclosure.

The following detailed description refers to the accompanying drawings. The same reference numbers in different drawings may identify the same or similar elements.

Before explaining at least one implementation of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other implementations or of being practiced or carried out in various ways. Also, it is to be understood that the phraseology and terminology employed herein are for purposes of description and should not be regarded as limiting.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the implementations herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement.

The use of the term "at least one" or "one or more" will be understood to include one as well as any quantity more than one. In addition, the use of the phrase "at least one of X, V, and Z" will be understood to include X alone, V alone, and Z alone, as well as any combination of X, V, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one implementation", "an implementation", or "some implementations" means that a particular element, feature, structure, or characteristic described in connection with the implementation is included in at least one implementation and may be used in conjunction with other implementations. The appearances of the phrase "in one implementation" or "in some implementations" in various places in the specification are not necessarily all referring to the same implementation.

Circuitry, as used herein, may be analog and/or digital components referred to herein as "blocks", or one or more suitably programmed processors (e.g., microprocessors) and associated hardware and software, or hardwired logic. Also, "components" or "blocks" may perform one or more functions. The term "component" or "block" may include hardware, such as a processor (e.g., a microprocessor), a combination of hardware and software, and/or the like.

Software may include one or more processor-executable instructions that when executed by one or more components (e.g., a processor) cause the component to perform a specified function. It should be understood that the algorithms described herein may be stored on one or more non-transitory processor-readable mediums, such as a memory. Exemplary non-transitory memory may include random-access memory (RAM), a read-only memory (ROM), a flash memory, and/or a non-volatile memory such as, for example, a CD-ROM, a hard drive, a solid-state drive, a flash drive, a memory card, a DVD-ROM, a Blu-ray Disk, a disk, and an optical drive, combinations thereof, and/or the like. Such non-transitory processor-readable media may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

The generation of laser beams for use as optical data channel signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

As used herein, an "optical communication path" and/or an "optical route" may correspond to an optical path and/or an optical light path. For example, an optical communication path may specify a path along which light is carried between two or more network entities along an optical fiber link (e.g., an optical fiber).

As used herein, an optical link may be an optical fiber, an optical channel, an optical super-channel, a super-channel group, an optical carrier group, a set of spectral slices, an optical control channel (e.g., sometimes referred to herein as an optical supervisory channel or an "OSC"), an optical data channel (e.g., sometimes referred to herein as "BAND"), and/or any other optical signal transmission link.

The optical network has one or more band. A band is the complete optical spectrum carried on the optical fiber. Depending on the optical fiber used and the supported spectrum which can be carried over long distances with the current technology, relevant examples of the same are: C-Band/L-Band/Extended-C-Band. As used herein, the C-Band is a band of light having a wavelength between about 1530 nm and about 1565 nm. The L-Band is a band of light having a wavelength between about 1565 nm and about 1625 nm. Because the wavelength range of the C-Band includes wavelengths smaller than the wavelengths of the wavelength range of the L-Band, the wavelengths of the C-Band may be described as short, or a shorter, wavelengths relative to the L-Band. Similarly, because the wavelengths of the L-Band are larger than the wavelengths of the C-Band, the wavelengths of the L-Band may be described as long, or a longer, wavelengths relative to the C-Band. An optical link may be composed of spectral slices pertaining to C-Band and/or L-Band spectrum. C+L Band spectrum has about 9.6 THz worth of optical bandwidth (i.e., 4.8 THz×2).

In some implementations, an optical super-channel may include multiple channels multiplexed together using wavelength-division multiplexing in order to increase transmission capacity. Various quantities of channels may be combined into super-channels using various modulation formats to create different super-channel types having different characteristics. Additionally, or alternatively, a super-channel group may include multiple super-channels multiplexed together using wavelength-division multiplexing in order to increase transmission capacity.

Additionally, or alternatively, an optical link may be a set of spectral slices. As used herein, a spectral slice (a "slice") may represent a spectrum of a particular size in a frequency band (e.g., 12.5 gigahertz ("GHz"), 6.25 GHz, 3.125 GHz, etc.). For example, a 4.8 terahertz (THz) frequency band may include 384 spectral slices, where each spectral slice may represent 12.5 GHz of the 4.8 THz spectrum. A slice may be the resolution at which the power levels can be measured by the optical power monitoring device. The power level being measured by the optical power monitoring device represents the total optical power carried by the portion of the band represented by that slice. A super-channel may include a different quantity of spectral slices depending on the super-channel type.

Spectral loading, or channel loading, is the addition of one or more channel to a specific spectrum of light described by the light's wavelength in an optical signal. When all channels within a specific spectrum are being utilized, the specific spectrum is described as fully loaded. A grouping of two or more channels may be called a channel group. Spectral loading may also be described as the addition of one or more channel group to a specific spectrum of light described by the light's wavelength to be supplied onto the optical fiber as the optical signal.

As used herein, a transmission line segment (which may be referred to as an optical link or an optical multiplex section) is the portion of a transmission line from a first node (e.g., ROADM) transmitting a transmission signal to a second node (e.g., ROADM) receiving the transmission signal. The transmission line segment may include one or more optical ILA situated between the first node and the second node. In some implementations, an optical multiplex section (OMS) has the same scope as the transmission line segment (TLS). In some implementations, the OMS may be a subset of a TLS. In some implementations, OMS-C (C-Band) and OMS-L (L-Band) may be combined together in an optical link or TLS. In some implementations, TLS may be used synonymously with Optical Link. An Optical Link may be composed of OMS-C and OMS-L As used herein, an optical span is a portion of an optical transmission line from a first network element (e.g., ROADM, optical amplifier, etc.) transmitting a transmission signal to a next network element (e.g., ROADM, optical amplifier, etc.) in the optical transmission line that receives the transmission signal. For instance, in an exemplary transmission line segment, a first optical span may connect a first ROADM to a first optical amplifier, a second optical span may connect the first optical amplifier to a second optical amplifier, and a third optical span may connect the second optical amplifier to a second ROADM.

Amplified spontaneous emission (ASE) is light produced by spontaneous emission that has been optically amplified by the process of stimulated emission in a gain medium. ASE is light that is incoherent and causes perturbations on the optical link. Every optical amplifier (e.g., EDFAs and Raman amplifiers) emit ASE. If an amplified spontaneous emission power level is too high relative to the transmission signal power level, the transmission signal in the optical fiber cable will be unreadable due to a low signal to noise ratio.

Transmission launch power may include a spectral power, which may be described in decibel-milliwatts (dBm or dBmW), of a transmission signal after each transmitter or amplifier.

A WSS (Wavelength Selective Switch) is a component used in optical communications networks to route (switch) optical signals between optical fibers on a per-slice basis. Generally, power level controls can also be done by the WSS by specifying an attenuation level on a passband filter. A Wavelength Selective Switch is a programmable device having source and destination fiber ports where the source and destination fiber ports and associated attenuation can be specified for a particular passband with a minimum bandwidth. The minimum bandwidth may be, for example, a slice. In one implementation, for example, the wavelength selective switch is operable to apply an attenuation for a particular passband having a first bandwidth and the optical power monitoring device has a resolution of a second bandwidth. The first bandwidth and the second bandwidth may be different (for example, the first bandwidth may be 12.5 GHz and the second bandwidth may be 3.125 GHz). In this implementation, then, the WSS may have a different slice width than the optical power monitor slice width.

As used herein, a reconfigurable optical add-drop multiplexer (ROADM) node refers to an all-optical subsystem that enables remote configuration of wavelengths at any ROADM node. In other words, a ROADM enables optical switching of an optical signal without requiring conversion of the optical signal from an optical domain into an electrical or digital domain. A ROADM is software-provisionable so that a network operator can choose whether a wavelength is added, dropped, or passed through the ROADM node. The technologies used within the ROADM node include wavelength blocking, planar light wave circuit (PLC), and wavelength selective switching (WSS)—though the WSS has become the dominant technology. A ROADM system is a metro/regional wavelength division multiplexing (WDM) or long-haul dense wavelength division multiplexing (DWDM) system that includes a ROADM node. ROADMs are often talked about in terms of degrees of switching, ranging from a minimum of two degrees to as many as eight degrees, and occasionally more than eight degrees. A "degree" is another term for a switching direction and is generally associated with a transmission fiber pair. A two-degree ROADM node switches in two directions, typically called East and West. A four-degree ROADM node switches in four directions, typically called North, South, East, and West. In a WSS-based ROADM network, each degree requires an additional WSS switching element. So, as the directions switched at a ROADM node increase, the ROADM node's cost increases.

An exemplary optical transport network consists of two distinct domains: Layer 0 ("optical domain" or "optical layer") and Layer 1 ("digital domain") data planes. Layer 0 is responsible for fixed or reconfigurable optical add/drop multiplexing (R/OADM) and optical amplification (EDFA or Raman) of optical channels and optical channel groups (OCG), typically within the 1530 nm-1565 nm range, known as C-Band. ROADM functions are facilitated via usage of a combination of colorless, directionless, and contentionless (CDC) optical devices, which may include wavelength selective switches (WSS), Multicast switches (MCS). Layer 0 may include the frequency grid (for example, as defined by ITU G.694.1), ROADMs, FOADMs, Amps, Muxes, Line-system and Fiber transmission, and GMPLS Control Plane (with Optical Extensions). Layer 1 functions encompass transporting client signals (e.g., Ethernet, SONET/SDH) in a manner that preserves bit transparency, timing transparency, and delay-transparency. The predominant technology for digital layer data transport in use today is OTN (for example, as defined by ITU G.709). Layer 1 may transport "client layer" traffic. Layer 1 may be a digital layer including multiplexing and grooming. The optical layer may further be divided into either an OTS layer or an OCH layer. The OTS layer refers to the optical transport section of the optical layer, whereas the OCH layer refers to one or more optical channels which are co-routed (e.g., together as multiple channels).

As used herein, tilt, also called linear power tilt, is defined as the linear change in power with wavelength over the signal spectrum per 1.0 THz. Due to Raman gain, short wavelength signals provide Raman gain for longer wavelengths. SRS Tilt strength, that is the difference in gain between the longest wavelength and the shortest wavelength of the signals, depends on the transmission signal power, spectral loading, fiber type, and fiber length. In one example, the tilt arises from power that is depleted from C-band signals to amplify L-band signals. Linear tilt slope can be defined in units of dB/THz. Tilt may occur in the C-Band, the L-Band, the C+L-Band, combinations thereof, and/or the like. Tilt may be described as linear tilt slope times amplifier bandwidth. For example only, assuming a linear tilt slope of 0.625 dB/THz, tilt in either the C-Band or L-Band would be (0.625 dB/THz*4.8 THz)=3 dB and, assuming a linear tilt slope of 0.4 dB/THz, tilt across both C-Band and L-Band would be (0.4 dB/THz*9.875 THz)=3.95 dB.

Referring now to the drawings and in particular to FIG. 1, shown therein is a diagrammatic view of an exemplary implementation of an optical transport network 10 (hereinafter, the "transport network 10") constructed in accordance with the present disclosure. The transport network 10 is shown as having a plurality of network elements 14a-n (hereinafter, the "network elements 14"), such as a first network element 14a (hereinafter, the "head-end network element 14a") and a second network element 14b (hereinafter, the "tail-end network element 14b") shown in FIG. 1, an optical multiplex section (OMS) 18 connecting the head-end network element 14a and the tail-end network element 14b, and one or more intermediate line amplifiers (ILAs) 22a-n (hereinafter, the "ILAs 22"), such as a first ILA 22a, a second ILA 22b, and one or more third ILAs 22n shown in FIG. 1, in the OMS 18 between the head-end network element 14a and the tail-end network element 14b.

As shown in FIG. 1, initially (i.e., when the OMS 18 is initially provisioned), a first tilt control section (TCS) 20a may be defined as being between the head-end network element 14a and the tail-end network element 14b. That is, the first TCS 20a initially has the same scope as the OMS 18. However, in accordance with the present disclosure, one or more tilt control sections (TCSs) 20 (hereinafter, the "TCSs 20") may be defined as being between any two nodes in the transport network 10. That is, each of the TCSs 20 may be a subset of the OMS 18. As described in more detail below, the TCSs 20 may be defined by any of the nodes of the transport network 10.

Though two of the network elements 14 and three ILAs 22, are shown for exemplary purposes, it will be understood that the transport network 10 may include a number of the network elements 14 and ILAs 22 that is greater or fewer than shown.

Data transmitted within the transport network 10 from the head-end network element 14a to the tail-end network element 14b may travel along the OMS 18 formed by the ILAs 22 and one or more optical fiber link 26 (hereinafter, the "optical fiber links 26"). In the implementation shown in FIG. 1, the OMS 18 is formed by a first optical fiber link 26a, the first ILA 22a, a second optical fiber link 26b, the one or more third ILAs 22n, a third optical fiber link 26c, the second ILA 22b, and a fourth optical fiber link 26d.

The transport network 10 may be, for example, considered as a graph made up of interconnected individual nodes (that is, the network elements 14 and the ILAs 22). In one implementation, the transport network 10 may include any type of network that uses light as a transmission medium. For example, the transport network 10 may include a fiber-optic based network, an optical transport network, a light-emitting diode network, a laser diode network, an infrared network, a wireless optical network, a wireless network, combinations thereof, and/or other types of optical networks.

The network elements 14 may include one or more devices that gather, process, store, and/or provide information in a manner described herein. For example, the network elements 14 may include one or more optical data processing and/or traffic transfer devices, such as an optical add-drop multiplexer ("OADM"), a reconfigurable optical add-drop multiplexer ("ROADM"), a flexibly reconfigurable optical add-drop multiplexer module ("FRM"), and/or any type of device capable of processing and/or transferring optical traffic.

In some implementations, the network elements 14 may include OADMs and/or ROADMs capable of being configured to add, drop, multiplex, and demultiplex optical signals. The network elements 14 may process and transmit optical signals to others of the network elements 14 throughout the transport network 10 in order to deliver optical transmissions.

In some implementations, a user 30 may interact with the transport network 10 using one or more user device 34 (hereinafter, the "user device 34") that may be used to request, such as from a network administration device 38, a graphical user interface (GUI) 42 configured to accept input from the user 30 that may be transmitted to one or more of the network elements 14 and/or one or more of the ILAs 22. In some implementations, the network administration device 38 may be connected to the transport network 10 and the user device 34 via a communication network 46. In some implementations, the communication network 46 may be the Internet and/or other network. For example, if the communication network 46 is the Internet, the GUI 42 of the transport network 10 may be delivered through a series of web pages or private internal web pages of a company or corporation, which may be written in hypertext markup language. It should be noted that the GUI 42 of the transport network 10 may be another type of interface including, but not limited to, a Windows-based application, a tablet-based application, a mobile web interface, an application running on a mobile device, and/or the like.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the transport network 10 may perform one or more functions described as being performed by another one or more of the devices of the transport network 10. Devices of the transport network 10 may interconnect via wired connections, wireless connections, or a combination of wired and wireless connections.

Figure 2:
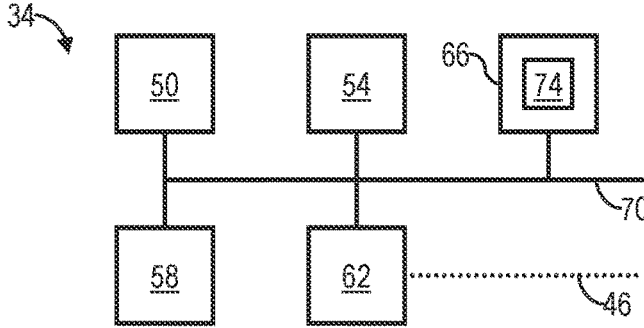
FIG. 2 is a diagrammatic view of an exemplary implementation of a user device shown in FIG. 1.

As shown in FIG. 2, the user device 34 may include, but is not limited to, implementation as a personal computer, a cellular telephone, a smart phone, a network-capable television set, a tablet, a laptop computer, a desktop computer, a network-capable handheld device, a server, a digital video recorder, a wearable network-capable device, and/or the like.

In some implementations, the user device 34 may include one or more input devices 50 (hereinafter, the "input device 50"), one or more output devices 54 (hereinafter, the "output device 54"), one or more processors 58 (hereinafter, the "processor 58"), one or more communication devices 62 (hereinafter, the "communication device 62") capable of interfacing with the communication network 46, and one or more non-transitory processor-readable medium 66 (hereinafter, the "memory 66") storing processor executable instructions and/or software application(s), including, for example, a web browser capable of accessing a website and/or communicating information and/or data over a wireless or wired network (e.g., the communication network 46), and/or the like. The input device 50, the output device 54, the processor 58, the communication device 62, and the memory 66 may be connected via a path 70 such as a data bus that permits communication among the components of the user device 34.

The memory 66 may store an application 74 that, when executed by the processor 58, causes the user device 34 to display the GUI 42. In some implementations, the application 74 is programmed to cause the processor 58 to provide the GUI 42 that allows the user 30 to interact with the network elements 14.

The input device 50 may be capable of receiving information input from the user 30 and/or the processor 58 and transmitting such information to other components of the user device 34 and/or the transport network 10. The input device 50 may include, but is not limited to, implementation as a keyboard, touchscreen, mouse, trackball, microphone, fingerprint reader, infrared port, slide-out keyboard, flip-out keyboard, cell phone, PDA, remote control, fax machine, wearable communication device, network interface, combinations thereof, and/or the like, for example.

The output device 54 may be capable of outputting information in a form perceivable by the user 30 and/or the processor 58. For example, implementations of the output device 54 may include, but are not limited to, a computer monitor, a screen, a touchscreen, a speaker, a website, a television set, a smart phone, a PDA, a cell phone, a fax machine, a printer, a laptop computer, combinations thereof, and the like, for example. It is to be understood that in some exemplary implementations, the input device 50 and the output device 54 may be implemented as a single device, such as, for example, a touchscreen of a computer, a tablet, or a smartphone. It is to be further understood that, as used herein, the term "user" is not limited to a human being, and may comprise a computer, a server, a website, a processor, a network interface, a human, a user terminal, a virtual computer, combinations thereof, and/or the like, for example.

The user device 34 may be capable of interfacing and/or communicating with the network administration device 38 via the communication network 46. For example, the user device 34 may be configured to interface by exchanging signals (e.g., analog, digital, optical, and/or the like) via one or more ports (e.g., physical ports or virtual ports) using a network protocol, for example. Additionally, each user device 34 may be configured to interface and/or communicate with other user devices directly and/or via the communication network 46, such as by exchanging signals (e.g., analog, digital, optical, and/or the like) via one or more ports.

The communication network 46 may permit bi-directional communication of information and/or data between the network administration device 38, the user device 34, the network elements 14, and/or the ILAs 22. The communication network 46 may interface with the network administration device 38, the user device 34, the network elements 14, and/or the ILAs 22 in a variety of ways. For example, in some implementations, the communication network 46 may interface by optical and/or electronic interfaces, and/or may use a plurality of network topographies and/or protocols including, but not limited to, Ethernet, TCP/IP, circuit switched path, combinations thereof, and/or the like. For example, in some implementations, the communication network 46 may be implemented as the World Wide Web (or Internet), a local area network (LAN), a wide area network (WAN), a metropolitan network, a 4G network, a 5G network, a satellite network, a radio network, an optical network, a cable network, a public switch telephone network, an Ethernet network, combinations thereof, and/or the like, for example. Additionally, the communication network 46 may use a variety of network protocols to permit bi-directional interface and/or communication of data and/or information between the network administration device 38, the user device 34, the network elements 14, and/or the ILAs 22.

Figure 3:
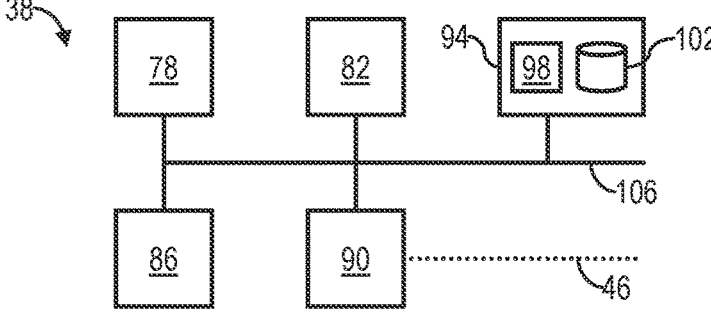
FIG. 3 is a diagrammatic view of an exemplary implementation of a network administration device shown in FIG. 1.

Referring now to FIG. 3, shown therein is a diagrammatic view of an exemplary implementation of the network administration device 38. The network administration device 38 may include one or more devices that gather, process, search, store, and/or provide information in a manner described herein. In the illustrated implementation, the network administration device 38 is provided with one or more input devices 78 (hereinafter, the "input device 78"), one or more output devices 82 (hereinafter "output device 82"), one or more processors 86 (hereinafter "processor 86"), one or more communication devices 90 (hereinafter "communication device 90"), and one or more non-transitory processor-readable medium 94 (hereinafter, the "memory 94") storing processor executable instructions and/or one or more software applications 98 (hereinafter, the "software application 98") and one or more databases 102 (hereinafter, the "database 102"). The input device 78, the output device 82, the processor 86, the communication device 90, and the memory 94 may be connected via a path 106 such as a data bus that permits communication among the components of the network administration device 38.

The database 102 may be a relational database or a non-relational database. Examples of such databases comprise, DB2®, Microsoft® Access, Microsoft® SQL Server, Oracle®, MySQL, PostgreSQL, MongoDB, Apache Cassandra, and the like. It should be understood that these examples have been provided for the purposes of illustration only and should not be construed as limiting the presently disclosed inventive concepts. The database 102 may be centralized or distributed across multiple systems.

In some implementations, the network administration device 38 may comprise one or more of the processor 86 working together, or independently, to execute processor-executable code stored on the memory 94. Each element of the network administration device 38 may be partially or completely network-based or cloud-based, and may or may not be located in a single physical location. The processor 86 may be implemented as a single processor or multiple processors working together, or independently, to execute the software application 98 as described herein. It is to be understood that in certain implementations using more than one of the processor 86, each may be located remotely from one another, located in the same location, or comprising a unitary multi-core processor. The processor 86 may be capable of reading and/or executing processor-executable code and/or capable of creating, manipulating, retrieving, altering, and/or storing data structures into the memory 94.

Exemplary implementations of the processor 86 of the network administration device 38 may include, but are not limited to, a digital signal processor (DSP), a central processing unit (CPU), a field programmable gate array (FPGA), a graphics processing unit (GPU), a microprocessor, a multi-core processor, combinations, thereof, and/or the like, for example. The processor 86 may be capable of communicating with the memory 94 of the network administration device 38 via the path 106. The processor 86 may be further capable of communicating with the input device 78 and/or the output device 82 of the network administration device 38.

The processor 86 of the network administration device 38 may be further capable of interfacing and/or communicating with the user device 34, the network elements 14, and/or the ILAs 22 via the communication network 46 using the communication device 90 of the network administration device 38. For example, the processor 86 may be capable of communicating via the communication network 46 by exchanging signals (e.g., analog, digital, optical, and/or the like) via one or more ports (e.g., physical or virtual ports) using a network protocol to interface and/or communicate with the user device 34, the network elements 14, and/or the ILAs 22.

The memory 94 of the network administration device 38 may be capable of storing processor-executable instructions, such as the software application 98, and/or information, such as the database 102. Additionally, the memory 94 may be implemented as a conventional non-transitory memory, such as for example, random access memory (RAM), CD-ROM, a hard drive, a solid-state drive, a flash drive, a memory card, a DVD-ROM, a disk, an optical drive, combinations thereof, and/or the like, for example. In some implementations, the software application 98 may be stored as a data structure, such as the database 102 and/or a data table, for example, or in non-data structure format such as in a non-compiled text file.

In some implementations, the memory 94 of the network administration device 38 may be located in the same physical location as the network administration device 38, and/or one or more of the memory 94 may be located remotely from the network administration device 38. For example, the memory 94 may be located remotely from the network administration device 38 and communicate with the processor 86 via the communication network 46. Additionally, when more than one of the memory 94 is used, a first one of the memory 94 may be located in the same physical location as the processor 86, and an additional one of the memory 94 may be located in a location physically remote from the processor 86. Additionally, the memory 94 may be implemented as a "cloud" non-transitory computer readable medium (i.e., one or more of the memory 94 may be partially or completely based on or accessed using the communication network 46).

The input device 78 of the network administration device 38 may transmit data to the processor 86 of the network administration device 38 and may be similar to the input device 50 of the user device 34. The input device 78 of the network administration device 38 may be located in the same physical location as the processor 86, or located remotely and/or partially or completely network-based. The output device 82 of the network administration device 38 may transmit information from the processor 86 to the user 30, and may be similar to the output device 54 of the user device 34. The output device 82 of the network administration device 38 may be located with the processor 86, or located remotely and/or partially or completely network-based.

The network administration device 38 may be capable of interfacing and/or communicating with the user device 34 via the communication network 46. For example, the network administration device 38 may be configured to interface by exchanging signals (e.g., analog, digital, optical, and/or the like) via one or more ports (e.g., physical ports or virtual ports) using a network protocol, for example. Additionally, each network administration device 38 may be configured to interface and/or communicate with other network administration devices 38 directly and/or via the communication network 46, such as by exchanging signals (e.g., analog, digital, optical, and/or the like) via one or more ports.

Figures 4, 5:
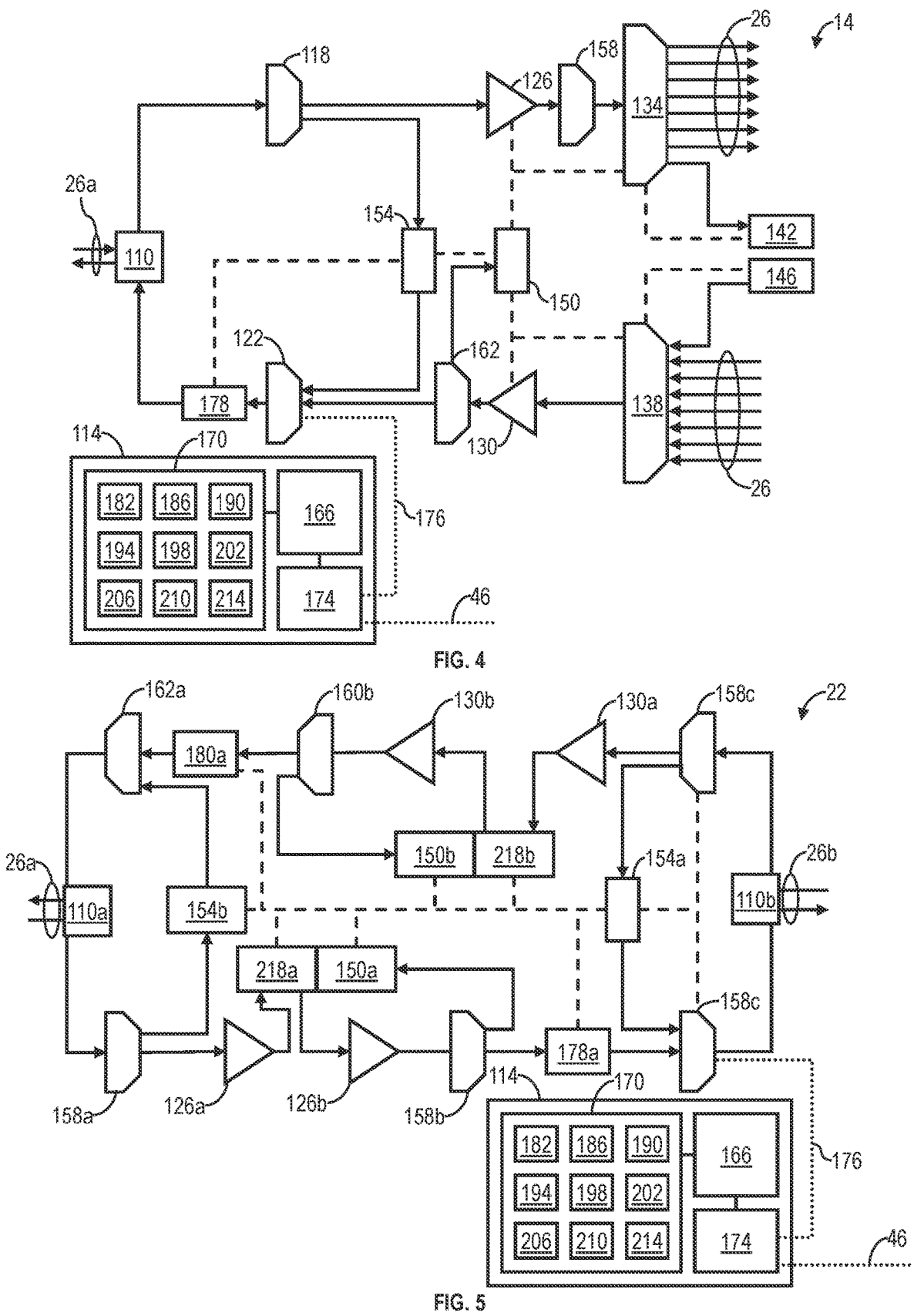
FIG. 4 is a diagrammatic view of an exemplary implementation of a network element shown in FIG. 1.
FIG. 5 is a diagrammatic view of an exemplary implementation of an intermediate line amplifier shown in FIG. 1.

Referring now to FIG. 4, shown therein is a diagrammatic view of an exemplary implementation of one of the network elements 14 of the transport network 10 constructed in accordance with the present disclosure. In general, the network element 14 transmits and receives data traffic and control signals. The head-end network element 14a and the tail-end network element 14b may be constructed in accordance with the construction of the network element 14 described below. In accordance with the present disclosure, the network element 14 may be a ROADM within the transport network 10 that allows dynamic software-driven provisioning of wavelengths in WDM and/or DWDM network services from a remote management system without major network changes or redesign.

The exemplary network element 14 shown in FIG. 4 is a ROADM that connects to the first optical fiber link 26a via a line port 110. Each of the optical fiber links 26, including the first optical fiber link 26a, the second optical fiber link 26b, the third optical fiber link 26c, and the fourth optical fiber link 26d, may include optical fiber pairs, wherein each fiber of the pair carries optical signal groups propagating in opposite directions. For simplicity, however, the network element 14 is shown as unidirectional with an optical signal (shown in FIG. 7A) propagating from the first optical fiber link 26a.

The network element 14 may be provided with the line port 110, a controller 114, an input filter 118, an output filter 122, an input amplifier 126, an output amplifier 130, an output WSS 134, an input WSS 138, one or more add transceivers 142 (hereinafter, the "add transceiver 142"), one or more drop transceivers 146 (hereinafter, the "drop transceiver 146"), an optical channel monitor (OCM) 150, an optical supervisory channel (OSC) 154, an input optical splitter 158, and an output optical combiner 162. The add transceiver 142 and the drop transceiver 146 may be in communication with the network element 14 to drop and add optical signals, respectively.

The controller 114 may have circuitry including one or more processors 166 (hereinafter, the "processor 166"), one or more non-transitory processor-readable mediums 170 (hereinafter, the "memory 170") storing processor-executable instructions, and one or more communication devices 174 (hereinafter, the "communication device 174") capable of interfacing with the communication network 46. The processor-executable instructions stored in the memory 170, when executed by the processor 166, may cause the processor 166 to perform one or more functions or processes, as described below.

It should be noted that the elements of the network element 14 are shown for illustration purposes only and should not be considered limiting. For instance, the network element 14 shown in FIG. 4 is one possible realization of a single degree of a ROADM. However, the network element 14 may be implemented as a multi-degree ROADM with a launch power for each optical segment serviced by the network element 14 implemented in accordance with the inventive concepts described herein. Further, the add transceiver 142 and the drop transceiver 146 may be implemented as a line card having multiple add and drop transceivers and may be configured to service channels across multiple ROADM degrees.

Nonexclusive examples of alternative implementations of the network element 14 include optical line terminals (OLTs), optical cross connects (OXCs), optical line amplifiers, optical add/drop multiplexer (OADMs) and/or reconfigurable optical add/drop multiplexers (ROADMs), interconnected by way of optical fiber links 26. OLTs may be used at either end of a connection or optical fiber link 26. OADM/ROADMs may be used to add, terminate and/or reroute wavelengths or fractions of wavelengths. Optical nodes are further described in U.S. Pat. No. 7,995,921 titled "Banded Semiconductor Optical Amplifiers and Waveblockers", U.S. Pat. No. 7,394,953 titled "Configurable Integrated Optical Combiners and Decombiners", and U.S. Pat. No. 8,223,803 (Application Publication Number 20090245289), titled "Programmable Time Division Multiplexed Switching," the entire contents of each of which are hereby incorporated herein by reference in its entirety. The network element 14, as illustrated in FIG. 4, is a two-degree ROADM, however, in other implementations, the network element 14 may have more than two degrees.

The OCM 150 of the network element 14 may provide the ability to monitor a power level at one or more sample frequency of the optical signal (shown in FIG. 7A) with a sample resolution. This information may then be used by the controller 114 of the network element 14 to attenuate and/or amplify each wavelength with the input amplifier 126, the output amplifier 130, the output WSS 134 the input WSS 138, and/or apply dynamic gain equalization (DGE) in order to optimize the power level of each wavelength.

The sample resolution of the OCM 150 may be, for example, between 12.5 GHz and 0.3125 GHz. In other implementations, the sample resolution may be less than 0.3125 GHz, for example, 0.15625 GHz or 78.125 MHz. For example, if the OCM 150 has a sample resolution of 12.5 GHz and the optical signal (shown in FIG. 7A) has a signal bandwidth of 125 GHz, the OCM 150 may slice the signal bandwidth into 10 spectral slices (shown in FIG. 7A) of 12.5 GHz where each spectral slice is centered on a particular sample frequency. The OCM 150 may thus determine the power level of each spectral slice for the optical signal based on the sample frequency for each spectral slice. In one implementation, as the OCM 150 determines a power level for a particular sample frequency, the power level/sample frequency pair is stored (e.g., in the memory 170 by the processor 166 of the controller 114). In one implementation, the OCM 150 may measure one or more optical characteristics of an optical signal, such as, for example, a power spectral density, a center frequency, an optical bandwidth, a shape, a channel slope, a channel roll-off, and/or the like or some combination thereof. In this way, the OCM 150 may be operable to sample an optical power of one or more spectral slice. The OCM 150 may be implemented as an optical power monitor, the construction and use of which is known in the art.

Figures 7A, 7B, 7C:
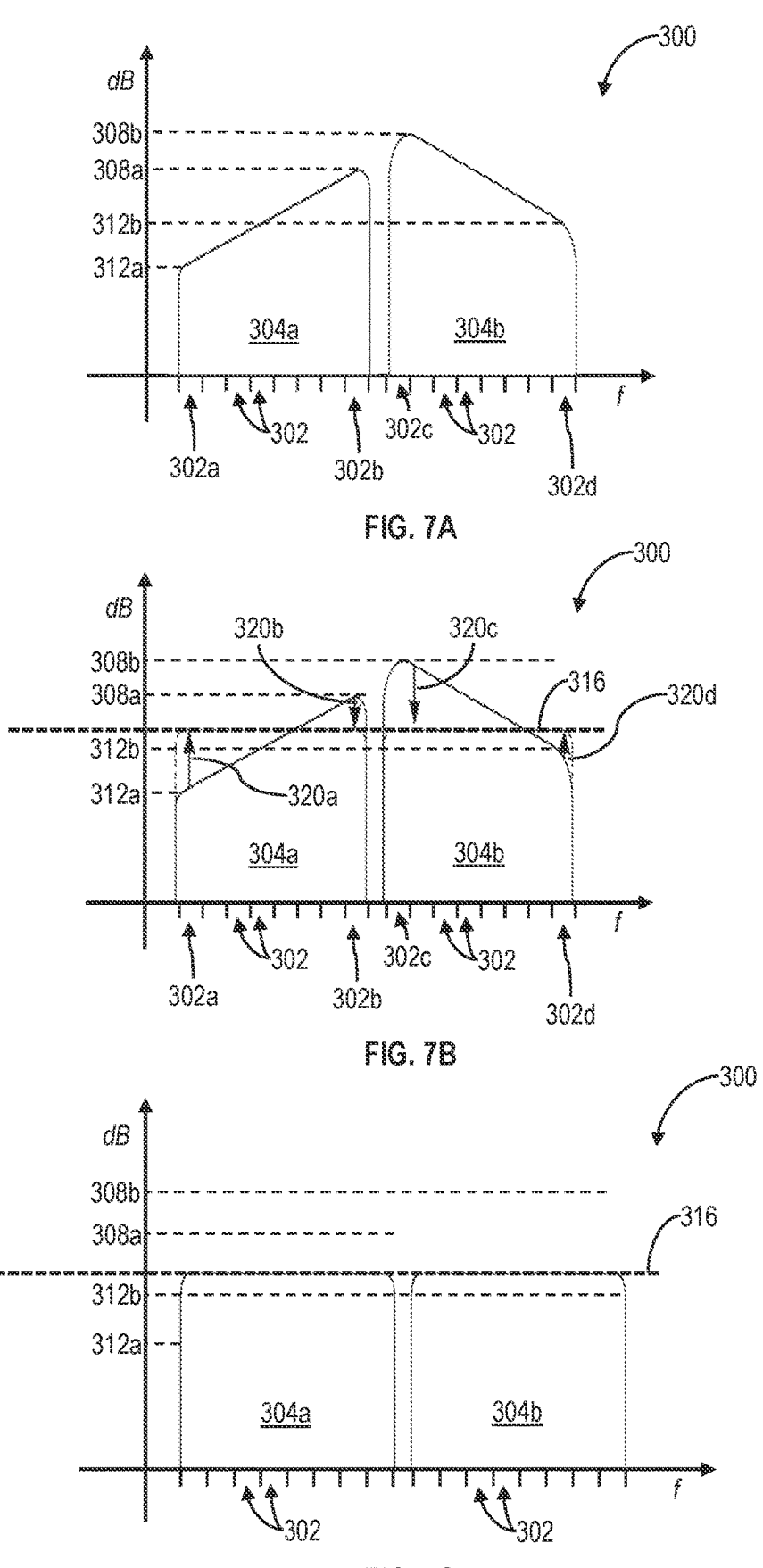
FIGS. 7A, 7B, and 7C are diagrammatic views of exemplary implementations of an optical signal in accordance with the present disclosure.

This slice-wise power level data can then be used by the controller 114 (e.g., processed by the processor 166 of the controller 114) to determine a sample power profile of the optical signal (shown in FIG. 7A). The sample power profile, then, may be a set of sample frequency/power level pairs for each spectral slice. In one implementation, the sample power profile may be a power profile of a selected subset of spectral slices (shown in FIG. 7A) of the optical signal.

In one implementation, the processor 166 of the controller 114 may include, but is not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 166 is in communication with the memory 170 of the controller 114 and may be operable to read and/or write to the memory 170.

In one implementation, the OCM 150 can also be used to troubleshoot the transport network 10. Coherent OCMs offer sub-GHz frequency accuracy and highly accurate power monitoring of fine spectral slices (shown in FIG. 7A) independent of adjacent channel power. Coherent OCMs reduce the C-band scanning time from seconds to hundreds of milliseconds and provide advanced processing of spectral characteristics, such as valid channel detection, center wavelength, and optical signal-to-noise ratio (OSNR).

In one implementation, the OSC 154 of the network element 14 provides a communication channel between adjacent nodes of the transport network 10 (e.g., the head-end network element 14*a* and the first ILA 22*a*) that can be used for functions including link control, in-band management, control plane (i.e., ASON/GMPLS), span loss measurement, and topology discovery. Static information about physical properties of the optical fiber link 26 (e.g., fiber types, loss, amplifier types, etc.) downstream from the network element 14 can be communicated to the controller 114 via the OSC 154.

As shown in FIG. 4, the network element 14 may include the controller 114 for controlling components of the network element 14. The network element 14 may be provided with an interface 176 that connects the controller 114 to the other components of the network element 14.

As described above, WSSs of the network element 14 are components that can dynamically route, block, and/or attenuate received optical signals (shown in FIG. 7A) input from and output to the optical fiber links 26. In addition to transmitting and/or receiving optical signals from the network element 14, optical signals may also be input from or output to the add transceiver 142 and the drop transceiver 146, respectively.

In one implementation, each WSS (i.e., the output WSS 134 and the input WSS 138) may be a reconfigurable, optical filter operable to allow one or more passbands (e.g., particular bandwidth(s) of the spectrum of the optical signal (shown in FIG. 7A)) to pass through or be routed as herein described.

In one implementation, the output WSS 134 may be a DEMUX WSS (i.e., can receive optical signals (shown in FIG. 7A) and may be operable to selectively switch, or direct, such optical signals to one or more other WSS for output from the network element 14). The output WSS 134 may also selectively or controllably supply optical signals to the drop transceiver 142.

In one implementation, the output WSS 134 may be referred to as a DEMUX module and may apply attenuations and filtering to an incoming optical signal (shown in FIG. 7A) before demultiplexing the incoming optical signal into one or more express optical signals or one or more drop optical signals.

The input WSS 138 may be a MUX WSS (e.g., operable to selectively receive optical signals (shown in FIG. 7A) from the add transceiver 146 in the network element 14 and from one or more express path, such as from an upstream network element 14). The optical signals output from the add transceiver 146 and/or from the express path may be selectively supplied to the input WSS 138 for output to the first optical fiber link 26*a*.

In one implementation, the input amplifier 126 and/or the output amplifier 130 of the network element 14 may be any optical amplifier configured to increase or supplement an optical power of the optical signal (shown in FIG. 7A). For example, one or more of the input amplifier 126 and the output amplifier 130 may be an Erbium doped fiber amplifier (EDFA). In one implementation, one or more of the input amplifier 126 and the output amplifier 130 may further include a variable optical attenuator (VOA).

In one implementation, the network element 14 further includes an output VOA 178. The output VOA 178 is an optical device operable to control attenuation (or insertion loss) according to an electrical control signal (e.g., received from the processor 166 of the controller 114). The insertion loss may be, for example, a calibrated known value.

As shown in FIG. 4, a first optical signal (shown in FIG. 7A) enters the network element 14 via the first optical fiber link 26*a* and passes through the input filter 118 before being split at the input optical splitter 158 where a sample portion of the first optical signal is directed to the OCM 150 while a remainder of the first optical signal continues to the output WSS 134.

As shown in FIG. 4, the OCM 150 and the OSC 154 are shared for both directions of the first optical fiber link 26*a*. In other implementations, however, each direction may have a dedicated OSC 154 and/or a dedicated OCM 150.

The interface 176 of the network element 14 may be a physical port or a software port through which data is exchanged with a neighboring network element 14. For instance, the interface 176 is illustrated as a port though which data may be transmitted and/or received over the OMS 18. While the network element 14 is shown as having one interface (i.e., the interface 176), it should be noted that the network element 14 may be provided having any number of the interface 176 known in the art.

The memory 170 of the controller 114 may store processor-executable instructions, such as a configuration module 182, an event updater module 186, a neighbor discovery module 190, a link topology module 194, a security module 198, an inbound message handler 202, an outbound message handler 206, a platform adaptation module 210, and a remote procedure call module 214 that when executed by the processor 166 cause the processor 166 to perform tasks that will be described further herein.

The remote procedure call module 214 may be configured to interface with the network administration device 38 and process configuration commands from the network administration device 38.

The configuration module 182 may be configured to interface with the remote procedure call module 214 and processes configuration commands received from the remote procedure call module 214. Once the configuration module 182 processes the configuration commands received from the remote procedure call module 214, the configuration module 182 may be programmed to save the processed configuration commands in the memory 170.

The event updater module 186 may be programmed to stream protocol events and alarm reports. Some exemplary events include, but are not limited to, a neighbor discover event, a neighbor lost event (e.g., a previously discovered neighbor node is no longer associated with an interface), a link topology information changed event, and a neighbor node information changed event. Exemplary alarm events may include, but are not limited to, a neighbor lost alarm (communication with a neighbor node is lost) and a configuration mismatch alarm (local configuration parameter(s) do not match with those received from a neighbor node).

The neighbor discovery module 190 may be programmed to generate discover messages and receive and process positive acknowledgment messages and negative acknowledgment messages as will be described in further detail herein.

The link topology module 194 may be programmed to gather link topology information and forward link topology information as will be described further herein.

The security module 198 may be programmed to provide a security aspect of the network element 14. For instance, the security module 198 may be programmed to provide encryption and authentication mechanisms such as integrity-based authentication.

The inbound message handler 202 and the outbound message handler 206 may be programmed to queue and prioritize messages entering and exiting the network element 14 and handing off the messages to the appropriate modules.

The platform adaptation module 210 may be programmed to bind messaging abstraction with platform specific system calls.

The number of devices illustrated in FIG. 4 are provided for explanatory purposes. In practice, there may be additional devices, fewer devices, different devices, or differently arranged devices than are shown in FIG. 4. Furthermore, two or more of the devices illustrated in FIG. 4 may be implemented within a single device, or a single device illustrated in FIG. 4 may be implemented as multiple, distributed devices. Additionally, one or more of the devices illustrated in FIG. 4 may perform one or more function described as being performed by another one or more of the devices illustrated in FIG. 4. Devices illustrated in FIG. 4 may interconnect via wired connections (e.g., optical fiber connections).

Referring now to FIG. 5, shown therein is a diagrammatic view of an exemplary implementation of one of the ILAs 22 of the transport network 10 shown in FIG. 1.

As shown in FIG. 5, the ILA 22 is an optical ILA 22 optically disposed between the first optical fiber link 26*a* via a first line port 110*a* and the second optical fiber link 26*b* via a second line port 110*b*. Each of the first optical fiber link 26*a* and the second optical fiber link 26*b* may include optical fiber pairs, wherein each fiber of the pair carries optical signal groups propagating in opposite directions. In one implementation, the ILA 22 may be an optical ILA 22 within the OMS 18 of the transport network 10.

In one implementation, the ILA 22 may be provided with the controller 114 having the processor 166 (also referred to herein as the "intermediate processor 166"), the memory 170 (also referred to herein as the "intermediate memory 170"), and the communication device 174 (also referred to herein as the "intermediate communication device 174") as described above.

In one implementation, the ILA 22, in a first direction (e.g., from the first optical fiber link 26*a* towards the second optical fiber link 26*b*), may further be provided with a first input optical splitter 158*a*, a first input amplifier 126*a*, a second input amplifier 126*b*, a second input optical splitter 158*b*, an input VOA 178*a*, a third input optical splitter 158*c*, a first dynamic gain amplifier 218*a*, a first OCM 150*a*, a first OSC 154*a*, and a second OSC 154*b*. The ILA 22, in a second direction (e.g., from the second optical fiber link 26*b* towards the first optical fiber link 26*a*), may further be provided with a first output optical splitter 160*a*, a first output amplifier 130*a*, a second output amplifier 130*b*, a second output optical splitter 160*b*, an output VOA 180*a*, a first output optical combiner 162*a*, a second dynamic gain amplifier 218*b*, and a second OCM 150*b*.

It should be noted that the elements of the ILA 22 are shown for illustration purposes only and should not be considered limiting. In some implementations, additional or fewer elements of the ILA 22 may be included in the ILA 22. For example, the ILA 22 may include photodetectors or other optical components.

In one implementation, one or more of the first dynamic gain amplifier 218*a* and the second dynamic gain amplifier 218*b* (collectively, the "DGEs 218") is a dynamic gain equalizer (e.g., a dynamic gain-flattening filter). The DGEs 218 are operable to attenuate an optical signal (shown in FIG. 7A) where the attenuation can be specified for at a resolution of a minimum bandwidth. The minimum bandwidth may be, for example, a slice. That is, the DGEs 218 may attenuate the optical signal on a per-slice basis (e.g., apply a tilt correction profile with a granularity of one spectral slice). The DGEs 218 may be based on a planar lightwave circuit, MEMS, liquid crystal, and/or acousto-optic technology. In one implementation, the DGEs 218 are operable to receive a control signal from the processor 166 (e.g., via the interface 176) to attenuate the optical signal.

In one implementation, the processor 166 of the controller 114 may transmit a tilt correction profile to the DGEs 218 and cause the DGEs 218 to apply the tilt correction profile to the optical signal (shown in FIG. 7A) (e.g., cause the DGEs 218 to attenuate the optical signal by increasing the optical power at the one or more sample frequency). In one implementation, for example, the DGEs 218, with a first minimum bandwidth, are operable to apply n tilt correction profile to an optical signal and the OCM 150 (e.g., the first OCM 150*a* and/or the second OCM 150*b*) has a second resolution of a second minimum bandwidth. The first minimum bandwidth and the second minimum bandwidth may be different (for example, the first minimum bandwidth may be 6.25 GHz and the second minimum bandwidth may be 3.125 GHz). In this implementation, then, the DGEs 218 may have a different slice width (e.g., the first minimum bandwidth/minimum resolution) than the OCM slice width (e.g., the second minimum bandwidth/second resolution).

The first OCM 150*a* and the second OCM 150*b* (collectively, the "OCMs 150") may be constructed in accordance with the OCM 150 described above. In one implementation, as shown in FIG. 5, the first OCM 150*a* and the first DGE 218*a* are combined into the same optical element, and the second OCM 150*b* and the second DGE 218*b* are combined into the same optical element. In other implementations, the first OCM 150*a* and the first DGE 218*a* are discrete optical elements and the second OCM 150*b* and the second DGE 218*b* are discrete optical elements. In yet another implementation, the first OCM 150*a* and the first DGE 218*a* are combined into the same optical element while the second OCM 150*b* and the second DGE 218*b* are discrete optical elements.

In one implementation, the first OSC 154*a* and the second OSC 154*b* provide a communication channel between adjacent nodes (e.g., the head-end network element 14*a* and the first ILA 22*a*) that can be used for functions including link control, in-band management, control plane (i.e., ASON/GMPLS), span loss measurement, and topology discovery, as described above in relation to the OSC 154.

The number of devices illustrated in FIG. 5 are provided for explanatory purposes. In practice, there may be additional devices, fewer devices, different devices, or differently arranged devices than are shown in FIG. 5. Furthermore, two or more of the devices illustrated in FIG. 5 may be implemented within a single device, or a single device illustrated in FIG. 3 may be implemented as multiple, distributed devices. Additionally, one or more of the devices illustrated in FIG. 5 may perform one or more function described as being performed by another one or more of the devices illustrated in FIG. 5.

Figure 6A:
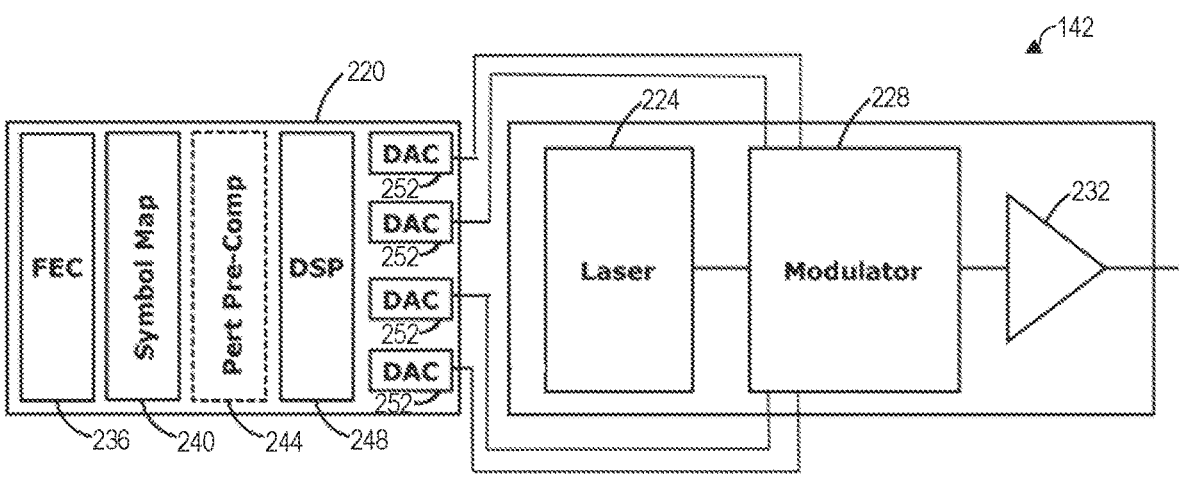
FIG. 6A is a diagrammatic view of an exemplary implementation of an add transceiver shown in FIG. 4.

Referring now to FIG. 6A, shown therein is a diagram of an exemplary implementation of the add transceiver 142 of the network element 14 shown in FIG. 4. The add transceiver 142 may comprise one or more transmitter processor circuit 220 (hereinafter, the "transmitter processor circuit 220"), one or more laser 224 (hereinafter, the "laser 224"), one or more modulator 228 (hereinafter, the "modulator 228"), one or more semiconductor optical amplifier 232 (hereinafter, the "semiconductor optical amplifier 232"), and/or other components (not shown). In one implementation, the add transceiver 142 is a coherent optical transceiver. In one implementation, the add transceiver 142 may have a transceiver bandwidth, such as 100 GHz, 200 GHz, or 400 GHz, for example.

The transmitter processor circuit 220 may have a Transmitter Forward Error Correction (FEC) circuitry 236, a Symbol Map circuitry 240, a transmitter perturbative pre-compensation circuitry 244, one or more transmitter digital signal processors (DSP) 248 (hereinafter, the "DSP 248"), and one or more digital-to-analogue converters (DAC) 252 (hereinafter, the "DAC 252"). The transmitter processor circuit 220 may be located in any one or more components of the add transceiver 142, or separate from the components, and/or in any location(s) among the components. The transmitter processor circuit 220 may be in the form of one or more Application Specific Integrated Circuit (ASIC), which may contain one or more modules and/or custom modules.

Processed electrical outputs from the transmitter processor circuit 220 may be supplied to the modulator 228 for encoding data into optical signals (shown in FIG. 7A) generated and supplied to the modulator 228 from the laser 224. The semiconductor optical amplifier 232 receives, amplifies, and transmits the optical signal including encoded data in the spectrum. Processed electrical outputs from the transmitter processor circuit 220 may be supplied to other circuitry in the transmitter processor circuit 220, for example, clock and data modification circuitry. The laser 224, the modulator 228, and/or the semiconductor optical amplifier 232 may be coupled with a tuning element (e.g., a heater) (not shown) that can be used to tune the wavelength of an optical signal channel output by the laser 224, the modulator 228, or the semiconductor optical amplifier 232. In some implementations, a single one of the laser 224 may be shared by multiple add transceiver(s) 104.

Other possible components in the add transceiver 142 may include filters, circuit blocks, memory, such as non-transitory memory storing processor-executable instructions, additional modulators, splitters, couplers, multiplexers, etc., as is well known in the art. The components may be combined, used, or not used, in multiple combinations or orders. Optical transmitters are further described in U.S. patent Publication No. 2012/0082453, titled "Wavelength division multiplexed optical communication system having variable channel spacings", the content of which is hereby incorporated by reference in its entirety herein.

Figure 6B:
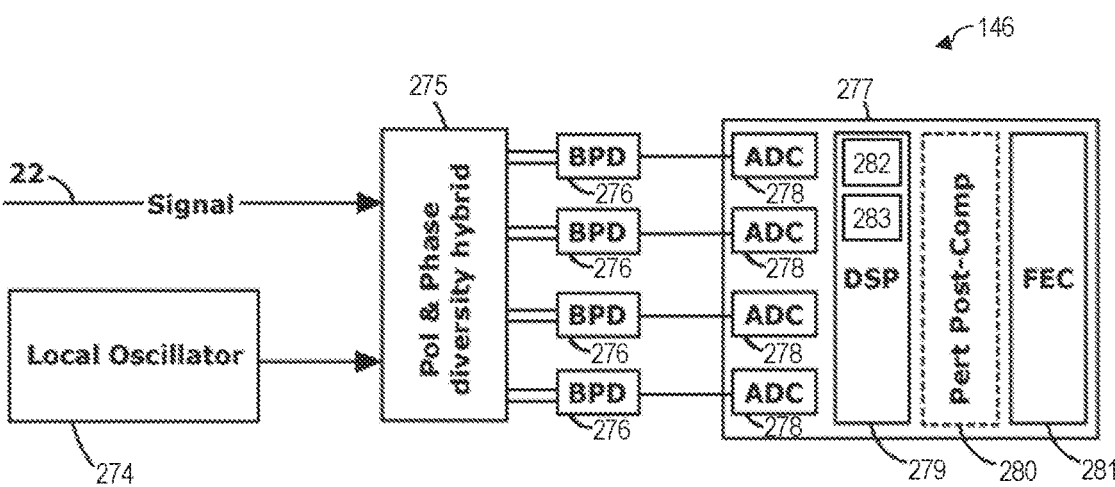
FIG. 6B is a diagrammatic view of an exemplary implementation of a drop transceiver shown in FIG. 4.

Referring now to FIG. 6B, shown therein is a block diagram of an exemplary implementation of the drop transceiver 146 of the network element 14 shown in FIG. 4. The drop transceiver 146 may comprise one or more local oscillators 274 (hereinafter, the "local oscillator 274"), a polarization and phase diversity hybrid circuit 275 receiving the one or more channels from the optical signal (shown in FIG. 7A) and the input from the local oscillator 274, one or more balanced photodiodes 276 (hereinafter, the "balanced photodiode 176") that produces electrical signals representative of the one or more channels on the spectrum, and one or more receiver processor circuits 277 (hereinafter, the "receiver processor circuit 277"). Other possible components in the drop transceiver 146 may include filters, circuit blocks, memory, such as non-transitory processor-readable mediums storing processor-executable instructions, additional modulators, splitters, couplers, multiplexers, etc., as is well known in the art. The components may be combined, used, or not used, in multiple combinations or orders. The drop transceiver 146 may be implemented in other ways, as is well known in the art. Exemplary implementations of the drop transceiver 146 are further described in U.S. patent application Ser. No. 12/052,541, titled "Coherent Optical Receiver", the entire contents of which are hereby incorporated by reference.

The receiver processor circuit 277 may comprise one or more analog-to-digital converters (ADC) 278 (hereinafter, the "ADC 278") receiving the electrical signals from the balanced photodiode 276, one or more receiver digital signal processors 279 (hereinafter, the "receiver DSP 279"), receiver perturbative post-compensation circuitry 280, and receiver forward error correction (FEC) circuitry (hereinafter, the "receiver FEC circuitry 281"). The receiver FEC circuitry 281 may apply corrections to the data, as is well known in the art. The receiver processor circuit 277 and/or the receiver DSP 279 may be located on one or more components of the drop transceiver 146 or separately from the components, and/or in any location(s) among the components. The receiver processor circuit 277 may be in the form of an Application Specific Integrated Circuit (ASIC), which may contain one or more modules and/or custom modules. In one implementation, the receiver DSP 279 may include, or be in communication with, one or more processors 282 (hereinafter, the "processor 282") and one or more non-transitory processor-readable mediums 283 (hereinafter, the "memory 283") storing processor-executable instructions, such as software, or may be in communication with the processor 166 and the memory 170.

The receiver DSP 279 may receive and process the electrical signals with multi-input-multiple-output (MIMO) circuitry, as described, for example, in U.S. Pat. No. 8,14, 686, titled "Polarization demultiplexing optical receiver using polarization oversampling and electronic polarization tracking", the entire contents of which are hereby incorporated by reference herein. Processed electrical outputs from the receiver DSP 279 may be supplied to other circuitry in the receiver processor circuit 277, such as the receiver perturbative post-compensation circuitry 280 and the receiver FEC circuitry 281.

Various components of the drop transceiver 146 may be provided or integrated, in one example, on a common substrate. Further integration is achieved by incorporating various optical demultiplexer designs that are relatively compact and conserve space on the surface of the substrate.

In use, the one or more channel of the spectrum may be subjected to optical non-linear effects between the add transceiver 142 and the drop transceiver 146 such that the spectrum received does not accurately convey carried data in the form that the spectrum was transmitted.

Referring now to FIGS. 7A-7C in combination, shown therein are diagrams of exemplary implementations of an optical signal 300 at differing periods of time. Generally, FIG. 7A shows an optical spectrum having the optical signal 300 prior to tilt correction by one or more of the DGE 218, the input amplifier 126, the output amplifier 130, the output WSS 134, and the input WSS 138, and shown with a plurality of spectral slices 302*a-n* (collectively, the "spectral slices 302"). The optical signal 300 within the optical spectrum may be considered an uncorrected optical signal. The optical signal 300 is shown with a first optical channel 304*a* and a second optical channel 304*b* (collectively, the "optical channels 304"). The optical channels 304 are shown with a "tilt". That is, as the frequency f increases, an optical power of each optical channel 304 either increases (i.e., positive tilt, such as is shown by the first optical channel 304*a*) or decreases (i.e., negative tilt, such as is shown by the second optical channel 304*b*). Each optical channel 304 has an upper optical power 308 and a lower optical power 312, shown as first upper optical power 308*a* and first lower optical power 312a for the first optical channel 304a and as second upper optical power 308b and second lower optical power 312b for the second optical channel 304b.

In one implementation, the OCM 150, inspecting the optical signal 300, may determine an optical power for each spectral slice 302 of each optical channel 304 (e.g., a spectral power density). For example, the OCM 150 may determine that a first sample optical power for a first spectral slice 302a as the first lower optical power 312a, a second sample optical power for a second spectral slice 302b as the first upper optical power 308a, a third sample optical power for a third spectral slice 302c as the second upper optical power 308b, and a fourth sample optical power for a fourth spectral slice 302d as the second lower optical power 312b.

Shown in FIG. 7B, the optical signal 300 is shown having the optical signal 300 prior to tilt correction by one or more of the DGE 218, the input amplifier 126, the output amplifier 130, the output WSS 134, and the input WSS 138 and is shown with the spectral slices 302. The optical signal 300 within the optical spectrum may be considered an uncorrected optical signal. Further shown in FIG. 7B is a target power profile 316. The target power profile 316 shows a target power for each spectral slice 302. As shown, the target power profile 316 has a first target power for the first spectral slice 302a, a second target power for the second spectral slice 302b, a third target power for the third spectral slice 302c, and a fourth target power for the fourth spectral slice 302d. In this implementation, each of the first target power, the second target power, the third target power, and the fourth target power are the same, e.g., each spectral slice 302 has the same target power. In other implementations, as shown below, each spectral slice 302 may have a different target power than one or more other spectral slice 302.

In one implementation, the processor 166 of the controller 114 may generate the tilt correction based off of the target power profile and the sample power profile. The tilt correction may be a difference between the target power profile 316 and the sample power profile. In one implementation, the processor 166 may generate the tilt correction profile as a plurality of offsets 320 for each spectral slice 302 of each optical channel 304 of the optical signal 300. For example, a first offset 320a for the first spectral slice 302a may be a difference between the first sample optical power (e.g., the first lower optical power 312a) and the target power profile 316, a second offset 320b for the second spectral slice 302b may be a difference between the second sample optical power (e.g., the first upper optical power 308a) and the target power profile 316, a third offset 320c for the third spectral slice 302c may be a difference between the third sample optical power (e.g., the second upper optical power 308b) and the target power profile 316, and a fourth offset 320d for the fourth spectral slice 302d may be a difference between the fourth sample optical power (e.g., the second lower optical power 312b) and the target power profile 316.

In one implementation, the processor 166 may generate the tilt correction profile based off of the target power profile 316 and the sample power profile shifted by an applied gain. The tilt correction profile may be a difference between the target power profile 316 and the sample power profile shifted by a largest offset 320 less than the target power profile 316. For example, in FIG. 7B, the first offset 320a is below the target power profile 316 and therefore optical power should be inserted at the first spectral slice 302a in order for the first spectral slice 302a to meet the target power profile 316. In one implementation, the processor 166 may cause one or more amplifier (e.g., the input amplifier 126 or the output amplifier 130) to increase an optical signal power across the first optical channel 304a by at least the first offset 320a such that the optical power of each spectral slice 302 of the first optical channel 304a is at least at or above the target power profile 316. The tilt correction profile, then, may be generated by the processor 166 such that application of the tilt correction profile (e.g., by the DGE 218, the input amplifier 126, the output amplifier 130, the output WSS 134, and/or the input WSS 138) causes the optical power of each spectral slice 302 to approach the target power profile 316 (i.e., within a predetermined margin of the target power profile 316).

In one implementation, the processor 166 of the controller 114, after generating the tilt correction profile, may cause one or more of the DGE 218, the input amplifier 126, the output amplifier 130, the output WSS 134, and the input WSS 138 to apply the tilt correction profile to the optical signal 300, as shown in FIG. 7C. In one implementation, to limit further transients due to power changes in the power spectral density of the optical signal 300, for example, the processor 166 may cause one or more of the DGE 218, the input amplifier 126, the output amplifier 130, the output WSS 134, and the input WSS 138 to apply the tilt correction profile gradually (e.g., in more than one iteration). For example, the tilt correction profile may be applied in two iterations, wherein the processor 166 may cause one or more of the DGE 218, the input amplifier 126, the output amplifier 130, the output WSS 134, and the input WSS 138 to apply a first portion of the each offset of the tilt correction profile across the optical signal 300 in a first iteration and apply a second portion of each offset of the tilt correction profile (or a remainder of the tilt correction profile) across the optical signal 300 in a second iteration. In one implementation, the second portion is less than the remainder (e.g., the second portion is less than the offset of the tilt correction profile less the first portion).

Shown in FIG. 7C, the optical signal 300 is shown having the optical signal 300 after tilt correction by one or more of the DGE 218, the input amplifier 126, the output amplifier 130, the output WSS 134, and the input WSS 138 and is shown with the spectral slices 302. The optical signal 300 within the optical spectrum may be considered a corrected optical signal as tilt correction has been performed by one or more of the DGE 218, the input amplifier 126, the output amplifier 130, the output WSS 134, and the input WSS 138. As shown in FIG. 7C, a first optical power of the first spectral slice 302a has been increased to the first target power of the target power profile, a second optical power of the second spectral slice 302b has been decreased to the second target power of the target power profile, a third optical power of the third spectral slice 302c has been increased to the third target power of the target power profile, and a fourth optical power of the fourth spectral slice 302d has been decreased to the fourth target power of the target power profile.

In one implementation, the optical signal 300 has more than two optical channels 304. For example, the optical signal 300 may have eight optical channels 304, or the optical signal 300 may have sixteen optical channels 304. In other implementations, the optical signal 300 may have any number of optical channels 304 greater than or equal to the number of the spectral slices 302 of the optical signal 300.

In one implementation, the optical signal 300 has more than sixteen of the spectral slices 302. For example, a 4.8 THz frequency band may include 384 spectral slices 302, where each spectral slice 302 may represent 12.5 GHz of the 4.8 THz spectrum. As spectral resolution of one or more of the DGE 218, the input amplifier 126, the output amplifier 130, the output WSS 134, and the input WSS 138 increases, the number of spectral slices 302 increases.

Referring now to FIGS. 8A and 8B, in combination, shown therein are diagrammatic views of an exemplary implementation of an optical carrier 322 before and after attenuation. Generally, FIG. 8A shows an optical spectrum having the optical carrier 322 prior to tilt correction by one or more of the DGE 218, the input amplifier 126, the output amplifier 130, the output WSS 134, and the input WSS 138 and shown with a plurality of optical subcarriers 324a-f. The optical carrier 322 within the optical spectrum may be considered an uncorrected optical signal. The optical carrier 322 is shown with a first optical subcarrier 324a, a second optical subcarrier 324b, a third optical subcarrier 324c, a fourth optical subcarrier 324d, a fifth optical subcarrier 324e, and a sixth optical subcarrier 324f. The optical sub-carriers 324 are shown with unwanted shaping, that is, the shape of the optical subcarriers 324 has a spectral shape different from a first target power profile 326a. Shown in FIG. 8A, as the frequency f increases, the optical power of each optical subcarrier 324 varies.

As shown in FIG. 8A, the first target power profile 326a is a predetermined non-uniform shaped power profile having one or more pre-emphasized edge subcarrier of the one or more optical subcarrier 324 of the optical carrier 322. As shown, the first target power profile 326a (i.e., the prede-termined non-uniform shaped power profile) has target powers that are not all the same for each spectral slice 302 of each optical subcarrier 324 of the optical carrier 322. In one implementation, the predetermined non-uniform shaped power profile may be applied to the optical signal 300 (e.g., the optical carrier 322) to pre-emptively attenuate the optical signal 300 in anticipation of optical filtering penalties the optical signal 300 will experience during transmission, such that, the optical signal 300, when received by a downstream network element 14 (e.g., the tail-end network element 14b), the optical signal 300 has less undesired optical shaping due to the optical filtering penalties than if the optical signal 300 had been transmitted with a flat target power profile (e.g., the first target power profile 316a).

For example, the first target power profile 326a has a fifth target power for a fifth spectral slice 302e and a sixth target power for a sixth spectral slice 302f where the fifth target power and the sixth target power are different. In one implementation, the one or more pre-emphasized edge sub-carrier may be, for example, the first optical subcarrier 324a having a target power profile greater than the second optical subcarrier 324b and the sixth optical subcarrier 324f having a target power profile greater than the fifth optical subcarrier 324e.

As shown in FIG. 8B, the first target power profile 326a may be "V"-shaped, meaning that outer edge subcarriers (the first optical subcarrier 324a and the sixth optical sub-carrier 324f) have a higher target power profile than inner edge subcarriers (the third optical subcarrier 324c and the fourth optical subcarrier 324d). In this implementation, outer-most spectral slices 302 (i.e., the fifth spectral slice 302e and a nineth spectral slice 302i) may have a same first target optical power, while inner-most spectral slices 302 (i.e., a seventh spectral slice 302g and an eighth spectral slice 302h) have a same second target optical power different from, and lesser than, the same first target optical power.

As shown in FIG. 8B, after the processor 166 determines the tilt correction profile and causes one or more of the DGE 218, the input amplifier 126, the output amplifier 130, the output WSS 134, and the input WSS 138 to attenuate and/or amplify the optical carrier 322 (e.g., each spectral slice 302 of each optical subcarrier 324 is tilt corrected) such that the optical carrier 322 has a power profile that is similar to the first target power profile 326a.

It should be noted that, after a first tilt correction, the optical signal 300 (e.g., the optical carrier 322) may have one or more offset 320 (e.g., offset 320e and offset 320f, for example). Therefore, in some implementations, a tilt cor-rection process (as described below) may be performed one or more additional instances to further attenuate and/or amplify the sample power profile into the target power profile (e.g., to further minimize the one or more offset 320). In some implementations, the power profile of the optical signal 300 may not match the target power profile after the tilt correction process is performed. In some implementa-tions, there may be a range for the target power profile and the tilt correction process may be used to move the power profile of the optical signal 300 toward and/or into the range for the target power profile.

Referring now to FIG. 8C, shown therein is a diagram-matic view of an exemplary implementation of the optical carrier shown in FIG. 8A, the optical carrier having a different target power profile in accordance with the present disclosure. As shown in FIG. 8C, a second target power profile 326b may be "U"-shaped, meaning that outer edge subcarriers (i.e., the first optical subcarrier 324a and the sixth optical subcarrier 324f) have a higher target power profile than inner subcarriers (i.e., the second optical sub-carrier 324b through the fifth optical subcarrier 324e) and the inner subcarriers have a similar optical power. In this implementation, outer-most spectral slices 302 of the outer edge subcarriers (i.e., the fifth spectral slice 302e through the sixth spectral slice 302f and the nineth spectral slice 302i through a tenth spectral slice 302j) may have a same first target optical power, while inner-most spectral slices 302 (i.e., all spectral slices 302 between the tenth spectral slice 302j and the sixth spectral slice 302f, exclusive, and asso-ciated with an optical subcarrier 324) have a same second target optical power different from, and lesser than, the same first target optical power.

As shown in FIG. 8C, after the processor 166 determines the tilt correction profile and causes one or more of the DGE 218, the input amplifier 126, the output amplifier 130, the output WSS 134, and the input WSS 138 to attenuate and/or amplify the optical carrier 322 (e.g., each spectral slice 302 of each optical subcarrier 324 is tilt corrected) such that the optical carrier 322 has a power profile that is similar to the target power profile 326.

It should be noted that, after a first tilt correction, the optical signal 300 (e.g., the optical carrier 322) may still have one or more offset 320, for example. Therefore, in some implementations, a tilt correction process (as described below) may be performed one or more additional instances to further attenuate and/or amplify the sample power profile (e.g., measured optical power of the optical carrier 322) into the target power profile (e.g., to further minimize the one or more offset 320).

Figure 9:
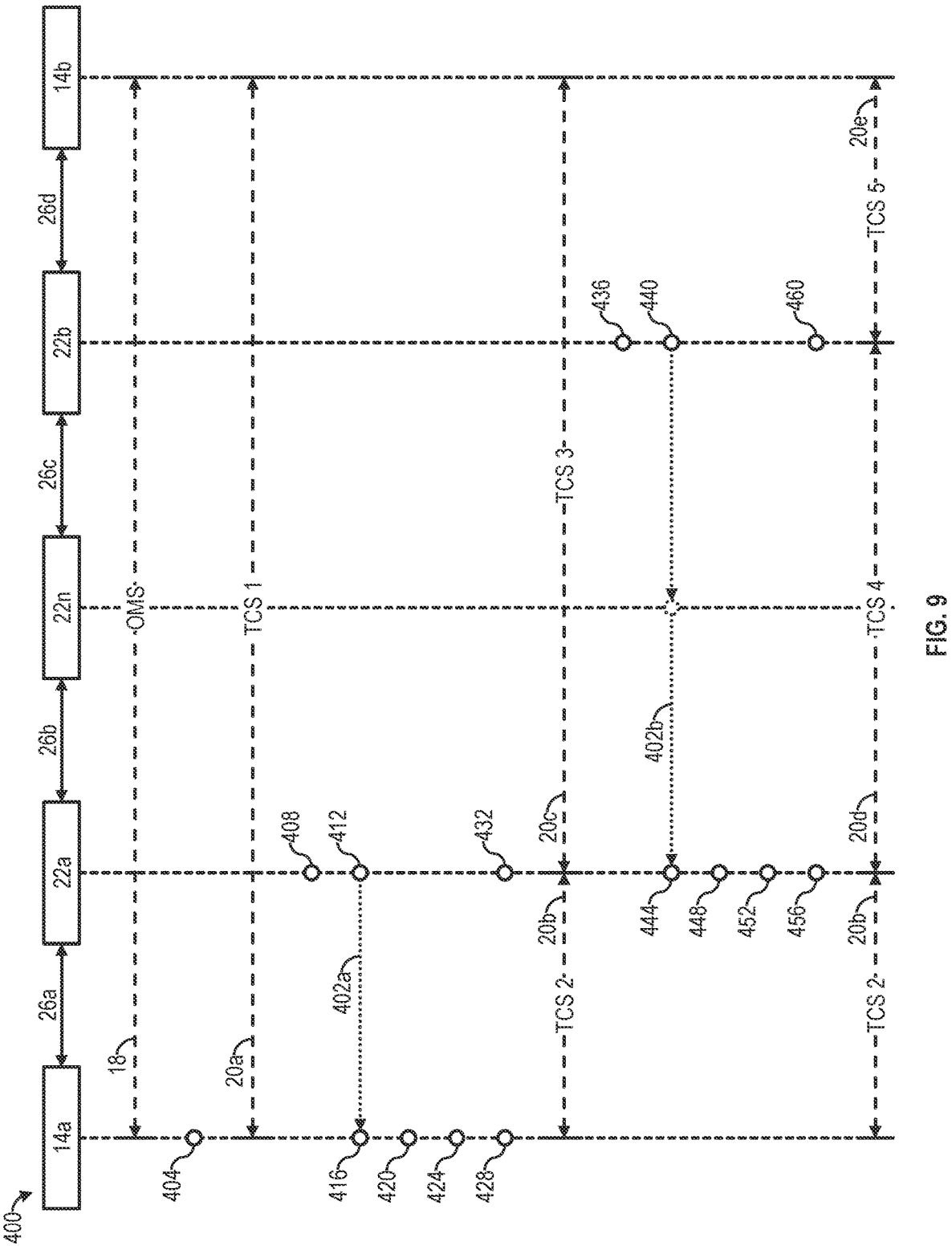
FIG. 9 is a diagrammatic view of an exemplary method of autonomous topology realization for tilt control in accordance with the present disclosure.

Referring now to FIG. 9, shown therein is a diagrammatic view of an exemplary method 400 of autonomous topology realization for tilt control in accordance with the present disclosure. In general, the method 400 may change the scope of the TCS 20 (that is, a change to which of the network elements 14 are include in the TCS 20) based on changes to the topology of the OMS 18, and may limit the correction of tilt to the network elements 14 included in the changed TCS 20.

Though a switch between the non-monitoring mode to the monitoring mode for a particular one of the ILAs 22 of the OMS 18 is used as examples of topology changes below, the method 400 may be used for other changes to the topology, such as a network element 14 being added or removed or becoming inoperable or faulted or other change.

At a step 404, the head-end network element 14a may store first tilt control information indicative of the first TCS 20a. As shown in FIG. 9, the first TCS 20a may be initially defined as having the same scope as that of the OMS 18. That is, the first TCS 20a may be initially defined as having the head-end network element 14a as a first upstream endpoint and the tail-end network element 14b as a first downstream endpoint.

At this stage of the method 400, the transport network 10 (shown in FIG. 11A) includes the first TCS 20a having the head-end network element 14a as the first upstream endpoint and the tail-end network element 14b as the first downstream endpoint. Accordingly, the first upstream endpoint of the first TCS 20a (i.e., the head-end network element 14a) may be configured to provide tilt control for each of the nodes in the first TCS 20a.

Referring now to FIG. 11A, the first downstream endpoint of the first TCS 20a (i.e., the tail-end network element 14b) may receive an optical signal 300 having a plurality of spectral slices 302, each of the spectral slices 302 of the optical signal 300 having a frequency range and an optical power level. The tail-end network element 14b may measure, using the OCM 150, the optical power level of each of the spectral slices 302 of the optical signal 300. The tail-end network element 14b may determine, using the processor 166 of the controller 114, based on the optical power level of each of the spectral slices 302 of the optical signal 300, a tilt of the optical signal 300. The tail-end network element 14b may send a first tilt control signal 406a in an upstream direction toward the first upstream endpoint of the first TCS 20a (i.e., the head-end network element 14a), the first tilt control signal 406a including tilt information indicating the tilt of the optical signal 300.

The first upstream endpoint of the first TCS 20a (i.e., the head-end network element 14a) may receive the first tilt control signal 406a. In response to receiving the first tilt control signal 406a, the head-end network element 14a may generate, with the processor 166 of the controller 114, based on the tilt information, a first tilt correction profile. The first tilt correction profile may include an amount of amplification or attenuation configured to be applied to each of the spectral slices 302 of the optical signal 300 to correct the tilt of the optical signal 300. The head-end network element 14a may send one or more distributed tilt correction signals 410a-n (hereinafter, the "distributed tilt correction signals 410") in a downstream direction toward the downstream endpoint of the first TCS 20a (i.e., the tail-end network element 14b), such as a first distributed tilt correction signal 410a, a second distributed tilt correction signal 410b, a third distributed tilt correction signal 410c, and a fourth distributed tilt correction signal 410d shown in FIG. 11A.

Each of the distributed tilt correction signals 410 may correspond to a particular one of the ILAs 22 of the first TCS 20a and may be configured to be received by the particular one of the ILAs 22 of the first TCS 20a. Each of the distributed tilt correction signals 410 may include a distributed tilt correction profile including a portion of the amount of amplification or attenuation configured to be applied to each of the spectral slices 302 of the optical signal 300 to correct the tilt of the optical signal 300. That is, a portion of the amount of amplification or attenuation configured to be applied to each of the spectral slices 302 of the optical signal

300 to correct the tilt of the optical signal 300 may be applied at each of the ILAs 22 of the first TCS 20a.

In some implementations, the method 400 further comprises determining, based on the line amplifier information, that a particular one of the ILAs 22 (hereinafter, the "faulted ILA 22") of the first TCS 20a is faulted or is otherwise unavailable to apply the portion of the amount of amplification or attenuation. Responsive to such a determination, the method 400 may further comprise changing the one or more distributed tilt correction profiles such that the portion of the amount of amplification or attenuation of the one or more distributed tilt correction profiles corresponding to the faulted ILA 22 is distributed among others of the distributed tilt correction profiles before sending the distributed tilt correction signals 410.

Referring back to FIG. 9, at a step 408, a change in the topology of the OMS 18 may occur. For example, at the direction of the user 30, the user device 34, and/or the network administration device 38, a particular one of the ILAs 22 of the first TCS 20a (e.g., the first ILA 22a) may cause the OCM 150 of the particular one of the ILAs 22 of the first TCS 20a (i.e., the first ILA 22a) to switch from a non-monitoring mode to a monitoring mode.

At a step 412, in response to the change in the topology of the OMS 18, notification may be sent to the first upstream endpoint of the first TCS 20a (i.e., the head-end network element 14a) of the change. For example, in response to the OCM 150 of the particular one of the ILAs 22 of the first TCS 20a (e.g., the first ILA 22a) switching from the non-monitoring mode to the monitoring mode, the particular one of the ILAs 22 of the first TCS 20a (i.e., the first ILA 22a) may send a first notification signal 402a in an upstream direction toward the first upstream endpoint of the first TCS 20a (i.e., the head-end network element 14a). The first notification signal 402a may include a topology information changed notification indicating that a topology of the OMS 18 has changed.

At a step 416, the first upstream endpoint of the first TCS 20a (i.e., the head-end network element 14a) may receive the first notification signal 402a from the particular one of the ILAs 22 of the first TCS 20a (i.e., the first ILA 22a).

At a step 420, in response to receiving the first notification signal 402a, the first upstream endpoint of the first TCS 20a (i.e., the head-end network element 14a) may determine topology information indicative of a topology of the OMS 18. The first upstream endpoint of the first TCS 20a (i.e., the head-end network element 14a) may determine the topology information by initiating a topology discovery process. In some implementations, the first upstream endpoint may not receive the first notification signal 402a, but may determine the topology information by initiating a topology discovery process. As nonlimiting examples, the first upstream endpoint may determine the topology information by one or more of: initiating a topology discovery process periodically, at reboot, on restoring control plane connectivity, triggered by other factors, and/or manually by a user. The topology information may include line amplifier information indicative of an operational status of the ILAs 22 of the first TCS 20a (e.g., whether the OCM 150 of each of the ILAs 22 of the first TCS 20a is in the non-monitoring mode or the monitoring mode).

At a step 424, the first upstream endpoint of the first TCS 20a (i.e., the head-end network element 14a) may determine, based on the operational status of the ILAs 22 of the first TCS 20a, that the OCM 150 of the particular one of the ILAs 22 of the first TCS 20*a* (i.e., the first ILA 22*a*) has switched from the non-monitoring mode to the monitoring mode.

At a step 428, the first upstream endpoint of the first TCS 20*a* (i.e., the head-end network element 14*a*) may store second tilt control information indicative of a second TCS 20*b*. As shown in FIG. 9, the second TCS 20*b* may be a subset of the first TCS 20*a*. The second TCS 20*b* may be defined as having the head-end network element 14*a* as a second upstream endpoint and the particular one of the ILAs 22 of the first TCS 20*a* (i.e., the first ILA 22*a*) as a second downstream endpoint.

At a step 432, the particular one of the ILAs 22 of the first TCS 20*a* (i.e., the second downstream endpoint of the second TCS 20*b*) (i.e., the first ILA 22*a*) may store third tilt control information indicative of a third TCS 20*c*. As shown in FIG. 9, the third TCS 20*c* may be a subset of the first TCS 20*a*. The third TCS 20*c* may be defined as having the particular one of the ILAs 22 of the first TCS 20*a* (i.e., the second downstream endpoint of the second TCS 20*b*), which in this example is the first ILA 22*a*, as a third upstream endpoint and the first downstream endpoint of the first TCS 20*a* (i.e., the tail-end network element 14*b*) as a third downstream endpoint.

At this stage of the method 400, the transport network 10 (shown in FIG. 11B) includes the second TCS 20*b* having the head-end network element 14*a* as the second upstream endpoint and the first ILA 22*a* as the second downstream endpoint, and the third TCS 20*c* having the first ILA 22*a* as the third upstream endpoint and the tail-end network element 14*b* as the third downstream endpoint. Accordingly, as described in greater detail below, the second upstream endpoint of the second TCS 20*b* (i.e., the head-end network element 14*a*) may be configured to provide tilt control for each of the nodes of the second TCS 20*b*, and the third upstream endpoint of the third TCS 20*c* (i.e., the first ILA 22*a*) may be configured to provide tilt control for each of the nodes in the third TCS 20*c*.

It will be understood that the number of network elements 14 described is exemplary and that additional network elements 14 may be included in the TCSs 20.

Referring now to FIG. 11B, the second downstream endpoint of the second TCS 20*b* (i.e., the first ILA 22*a*) may: receive an optical signal 300; measure, using the OCM 150, the optical power level of each of the spectral slices 302 of the optical signal 300; determine, based on the optical power level of each of the spectral slices 302 of the optical signal 300, a tilt of the optical signal 300; and send a second tilt control signal 406*b* in an upstream direction toward the second upstream endpoint of the second TCS 20*b* (i.e., the head-end network element 14*a*).

The second upstream endpoint of the second TCS 20*b* (i.e., the head-end network element 14*a*) may receive the second tilt control signal 406*b*; in response to receiving the second tilt control signal 406*b*, generate, based on the tilt information, a second tilt correction profile, the tilt correction profile including an amount of amplification or attenuation configured to be applied to each of the spectral slices 302 of the optical signal 300 to correct the tilt of the optical signal 300; and send distributed tilt correction signals 410 in a downstream direction toward the downstream endpoint of the second TCS 20*b* (i.e., the first ILA 22*a*), such as a fifth distributed tilt correction signal 410*e* shown in FIG. 11B.

In some implementations, the method 400 further comprises determining, based on the line amplifier information, that a particular one of the ILAs 22 (hereinafter, the "faulted ILA 22") of the second TCS 20*b* is faulted. Responsive to such a determination, the method 400 may further comprise changing the one or more distributed tilt correction profiles such that the portion of the amount of amplification or attenuation of the one or more distributed tilt correction profiles corresponding to the faulted ILA 22 is distributed among others of the distributed tilt correction profiles before sending the distributed tilt correction signals 410.

As further shown in FIG. 11B, the third downstream endpoint of the third TCS 20*c* (i.e., the tail-end network element 14*b*) may receive an optical signal 300; measure, using the OCM 150, the optical power level of each of the spectral slices 302 of the optical signal 300; determine, based on the optical power level of each of the spectral slices 302 of the optical signal 300, a tilt of the optical signal 300; and send a third tilt control signal 406*c* in an upstream direction toward the third upstream endpoint of the third TCS 20*c* (i.e., the first ILA 22*a*).

The third upstream endpoint of the third TCS 20*c* (i.e., the first ILA 22*a*) may: receive the third tilt control signal 406*c*; in response to receiving the third tilt control signal 406*c*, generate, based on the tilt information, a third tilt correction profile; and send distributed tilt correction signals 410 in a downstream direction toward the third downstream endpoint of the third TCS 20*c* (i.e., the tail-end network element 14*b*), such as a sixth distributed tilt correction signal 410*f*, a seventh distributed tilt correction signal 410*g*, and an eighth distributed tilt correction signal 410*h* shown in FIG. 11B.

In some implementations, the method 400 further comprises determining, based on the line amplifier information, that a particular one of the ILAs 22 (hereinafter, the "faulted ILA 22") of the third TCS 20*c* is faulted or is otherwise unavailable to apply the portion of the amount of amplification or attenuation. Responsive to such a determination, the method 400 may further comprise distributing the portion of the amount of amplification or attenuation to be applied at the faulted ILA 22 among others of the distributed tilt correction profiles before sending the distributed tilt correction signals 410.

Referring back to FIG. 9, at a step 436, at the direction of the user 30, the user device 34, and/or the network administration device 38, a particular one of the ILAs 22 of the third TCS 20*c* (e.g., the second ILA 22*b*) may cause the OCM 150 of the particular one of the ILAs 22 of the third TCS 20*c* (i.e., the second ILA 22*b*) to switch from the non-monitoring mode to the monitoring mode.

At a step 440, in response to the OCM 150 of the particular one of the ILAs 22 of the third TCS 20*c* (e.g., the second ILA 22*b*) switching from the non-monitoring mode to the monitoring mode, the particular one of the ILAs 22 of the third TCS 20*c* (i.e., the second ILA 22*b*) may send a second notification signal 402*b* in an upstream direction toward the third upstream endpoint of the third TCS 20*c* (i.e., the first ILA 22*a*). As shown in FIG. 9, the particular one of the ILAs 22 of the third TCS 20*c* (i.e., the second ILA 22*b*) may send the second notification signal 402*b* to an upstream neighbor (i.e., a particular one of the one or more third ILAs 22*n*), which may forward the second notification signal 402*b* in an upstream direction toward the third upstream endpoint of the third TCS 20*c* (i.e., the first ILA 22*a*). The second notification signal 402*b* may include a topology information changed notification indicating that a topology of the OMS 18 has changed.

At a step 444, the third upstream endpoint of the third TCS 20*c* (i.e., the first ILA 22*a*) may receive the second notification signal 402*b* from the particular one of the ILAs 22 of the third TCS 20*c* (i.e., the second ILA 22*b*).

At a step 448, in response to receiving the second notification signal 402b, the third upstream endpoint of the third TCS 20c (i.e., the first ILA 22a) may determine topology information indicative of a topology of the OMS 18. The third upstream endpoint of the third TCS 20c (i.e., the first ILA 22a) may determine the topology information by initiating a topology discovery process. In some implementations, the first upstream endpoint may not receive the second notification signal 402b, but may determine the topology information by initiating a topology discovery process. As nonlimiting examples, the third upstream endpoint may determine the topology information by one or more of: initiating a topology discovery process periodically, at reboot, on restoring control plane connectivity, triggered by other factors, and/or manually by a user. The topology information may include line amplifier information indicative of an operational status of the ILAs 22 of the third TCS 20c (e.g., whether the OCM 150 of each of the ILAs 22 of the third TCS 20c is in the non-monitoring mode or the monitoring mode).

At a step 452, the third upstream endpoint of the third TCS 20c (i.e., the first ILA 22a) may determine, based on the operational status of the ILAs 22 of the third TCS 20c, that the OCM 150 of the particular one of the ILAs 22 of the third TCS 20c (i.e., the first ILA 22a) has switched from the non-monitoring mode to the monitoring mode.

At a step 456, the third upstream endpoint of the third TCS 20c (i.e., the first ILA 22a) may store fourth tilt control information indicative of a fourth TCS 20d. As shown in FIG. 9, the fourth TCS 20d may be a subset of the third TCS 20c. The fourth TCS 20d may be defined as having the third upstream endpoint of the third TCS 20c (i.e., the first ILA 22a) as a fourth upstream endpoint and the particular one of the ILAs 22 of the third TCS 20c (i.e., the second ILA 22b) as a fourth downstream endpoint.

At a step 460, the particular one of the ILAs 22 of the third TCS 20c (i.e., the fourth downstream endpoint of the fourth TCS 20d) (i.e., the second ILA 22b) may store fifth tilt control information indicative of a fifth TCS 20e. As shown in FIG. 9, the fifth TCS 20e may be a subset of third TCS 20c. The fifth TCS 20e may be defined as the particular one of the ILAs 22 of the third TCS 20c (i.e., the fourth downstream endpoint of the fourth TCS 20d) (i.e., the second ILA 22b) as a fifth upstream endpoint and the third downstream endpoint of the third TCS 20c (i.e., the tail-end network element 14b) as a fifth downstream endpoint.

At this stage of the method 400, the transport network 10 (shown in FIG. 11C) includes the second TCS 20b having the head-end network element 14a as the second upstream endpoint and the first ILA 22a as the second downstream endpoint, the fourth TCS 20d having the first ILA 22a as the fourth upstream endpoint and the second ILA 22b as the fourth downstream endpoint, and the fifth TCS 20e having the second ILA 22b as the fifth upstream endpoint and the tail-end network element 14b as the fifth downstream endpoint. Accordingly, the second upstream endpoint of the second TCS 20b (i.e., the head-end network element 14a) may be configured to provide tilt control for each of the nodes in the second TCS 20b, the fourth upstream endpoint of the fourth TCS 20d (i.e., the first ILA 22a) may be configured to provide tilt control for each of the nodes in the fourth TCS 20d, and the fifth upstream endpoint of the fifth TCS 20e (i.e., the second ILA 22b) may be configured to provide tilt control for each of the nodes in the fifth TCS 20e.

Referring now to FIG. 11C, the second downstream endpoint of the second TCS 20b (i.e., the first ILA 22a) may receive an optical signal 300; measure, using the OCM 150, the optical power level of each of the spectral slices 302 of the optical signal 300; determine, based on the optical power level of each of the spectral slices 302 of the optical signal 300, a tilt of the optical signal 300; and send a second tilt control signal 406b in an upstream direction toward the second upstream endpoint of the second TCS 20b (i.e., the head-end network element 14a).

The second upstream endpoint of the second TCS 20b (i.e., the head-end network element 14a) may: receive the second tilt control signal 406b; in response to receiving the second tilt control signal 406b, generate, based on the tilt information, the second tilt correction profile; and send distributed tilt correction signals 410 in a downstream direction toward the downstream endpoint of the second TCS 20b (i.e., the first ILA 22a), such as the fifth distributed tilt correction signal 410e shown in FIG. 11D.

In some implementations, the method 400 further comprises determining, based on the line amplifier information, that a particular one of the ILAs 22 (hereinafter, the "faulted ILA 22") of the second TCS 20b is faulted. Responsive to such a determination, the method 400 may further comprise changing the one or more distributed tilt correction profiles such that the portion of the amount of amplification or attenuation of the one or more distributed tilt correction profiles corresponding to the faulted ILA 22 is distributed among others of the distributed tilt correction profiles before sending the distributed tilt correction signals 410.

As further shown in FIG. 11C, the fourth downstream endpoint of the fourth TCS 20d (i.e., the second ILA 22b) may: receive an optical signal 300; measure, using the OCM 150, the optical power level of each of the spectral slices 302 of the optical signal 300; determine, based on the optical power level of each of the spectral slices 302 of the optical signal 300, a tilt of the optical signal 300; and send a fourth tilt control signal 406d in an upstream direction toward the fourth upstream endpoint of the fourth TCS 20d (i.e., the first ILA 22a).

The fourth upstream endpoint of the fourth TCS 20d (i.e., the first ILA 22a) may: receive the fourth tilt control signal 406d; in response to receiving the fourth tilt control signal 406d, generate, based on the tilt information, a fourth tilt correction profile; and send distributed tilt correction signals 410 in a downstream direction toward the fourth downstream endpoint of the fourth TCS 20d (i.e., the second ILA 22b), such as a ninth distributed tilt correction signal 410i and a tenth distributed tilt correction signal 410j shown in FIG. 11C.

In some implementations, the method 400 further comprises determining, based on the line amplifier information, that a particular one of the ILAs 22 (hereinafter, the "faulted ILA 22") of the fourth TCS 20d is faulted or is otherwise unavailable to apply the portion of the amount of amplification or attenuation. Responsive to such a determination, the method 400 may further comprise changing the one or more distributed tilt correction profiles such that the portion of the amount of amplification or attenuation of the one or more distributed tilt correction profiles corresponding to the faulted ILA 22 is distributed among others of the distributed tilt correction profiles before sending the distributed tilt correction signals 410.

As further shown in FIG. 11C, the fifth downstream endpoint of the fifth TCS 20e (i.e., the tail-end network element 14b) may: receive an optical signal 300; measure, using the OCM 150, the optical power level of each of the spectral slices 302 of the optical signal 300; determine, based on the optical power level of each of the spectral slices 302 of the optical signal 300, a tilt of the optical signal 300;

and send a fifth tilt control signal 406e in an upstream direction toward the fifth upstream endpoint of the fifth TCS 20e (i.e., the second ILA 22b).

The fifth upstream endpoint of the fifth TCS 20e (i.e., the second ILA 22b) may: receive the fifth tilt control signal 406e; in response to receiving the fifth tilt control signal 406e, generate, based on the tilt information, a fifth tilt correction profile; and send distributed tilt correction signals 410 in a downstream direction toward the fifth downstream endpoint of the fifth TCS 20e (i.e., the tail-end network element 14b), such as an eleventh distributed tilt correction signal 410k shown in FIG. 11C.

In some implementations, the method 400 further comprises determining, based on the line amplifier information, that a particular one of the ILAs 22 (hereinafter, the "faulted ILA 22") of the fifth TCS 20e is faulted or is otherwise unavailable to apply the portion of the amount of amplification or attenuation. Responsive to such a determination, the method 400 may further comprise changing the one or more distributed tilt correction profiles such that the portion of the amount of amplification or attenuation of the one or more distributed tilt correction profiles corresponding to the faulted ILA 22 is distributed among others of the distributed tilt correction profiles before sending the distributed tilt correction signals 410.

Figure 10:
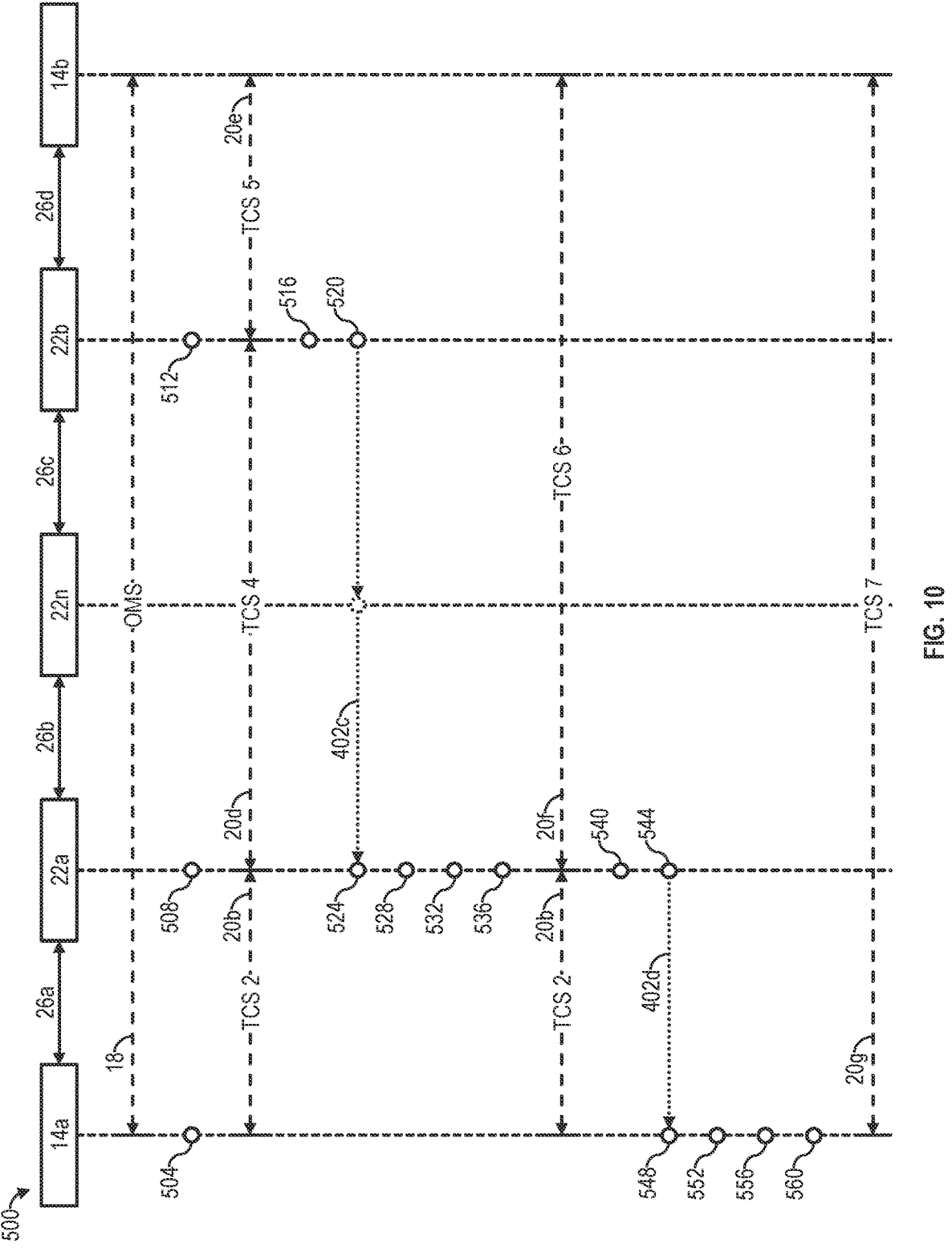
FIG. 10 is a diagrammatic view of another exemplary method of autonomous topology realization for tilt control in accordance with the present disclosure.

Referring now to FIG. 10, shown therein is a diagrammatic view of an exemplary method 500 of autonomous topology realization for tilt control in accordance with the present disclosure. In general, in this exemplary method 500, the TCSs 20 which are subsets of the OMS 18 may be combined in response to a change in the topology of the OMS 18, changing the scope of the TCS 20 (i.e., a change to which of the network elements 14 are included in the TCS 20), and may limit the correction of tilt to the network elements 14 included in the changed TCS 20.

At a step 504, the head-end network element 14a may store the second tilt control information indicative of the second TCS 20b. As shown in FIG. 10, the second TCS 20b may be initially defined as being a subset of the OMS 18. The second TCS 20b may be initially defined as having the head-end network element 14a as the second upstream endpoint and the first ILA 22a as the second downstream endpoint.

At a step 508, the first ILA 22a may store the fourth tilt control information indicative of the fourth TCS 20d. As shown in FIG. 10, the fourth TCS 20d may be initially defined as being a subset of the OMS 18. The fourth TCS 20d may be initially defined as having the first ILA 22a as the fourth upstream endpoint and the second ILA 22b as the fourth downstream endpoint.

At a step 512, the second ILA 22b may store the fifth tilt control information indicative of the fifth TCS 20e. As shown in FIG. 10, the fifth TCS 20e may be initially defined as being a subset of the OMS 18. The fifth TCS 20e may be initially defined as having the second ILA 22b as the fifth upstream endpoint and the tail-end network element 14b as the fifth downstream endpoint.

At this stage of the method 500, the transport network 10 (shown in FIG. 11C) includes the second TCS 20b having the head-end network element 14a as the second upstream endpoint and the first ILA 22a as the second downstream endpoint, the fourth TCS 20d having the first ILA 22a as the fourth upstream endpoint and the second ILA 22b as the fourth downstream endpoint, and the fifth TCS 20e having the second ILA 22b as the fifth upstream endpoint and the tail-end network element 14b as the fifth downstream endpoint. Accordingly, the second upstream endpoint of the second TCS 20b (i.e., the head-end network element 14a) may be configured to provide tilt control for each of the nodes in the second TCS 20b, the fourth upstream endpoint of the fourth TCS 20d (i.e., the first ILA 22a) may be configured to provide tilt control for each of the nodes in the fourth TCS 20d, and the fifth upstream endpoint of the fifth TCS 20e (i.e., the second ILA 22b) may be configured to provide tilt control for each of the nodes in the fifth TCS 20e.

At a step 516, at the direction of the user 30, the user device 34, and/or the network administration device 38, a particular one of the ILAs 22 of the fourth TCS 20d (e.g., the second ILA 22b) may cause the OCM 150 of the particular one of the ILAs 22 of the fourth TCS 20d (i.e., the second ILA 22b) to switch from the monitoring mode to the non-monitoring mode.

At a step 520, in response to the OCM 150 of the particular one of the ILAs 22 of the fourth TCS 20d (e.g., the second ILA 22b) switching from the monitoring mode to the non-monitoring mode, the particular one of the ILAs 22 of the fourth TCS 20d (i.e., the second ILA 22b) may send a third notification signal 402c in an upstream direction toward the fourth upstream endpoint of the fourth TCS 20d (i.e., the first ILA 22a). As shown in FIG. 10, the particular one of the ILAs 22 of the fourth TCS 20d (i.e., the second ILA 22b) may send the third notification signal 402c to an upstream neighbor (i.e., a particular one of the one or more third ILAs 22n), which may forward the third notification signal 402c in an upstream direction toward the fourth upstream endpoint of the fourth TCS 20d (i.e., the first ILA 22a). The third notification signal 402c may include a topology information changed notification indicating that a topology of the OMS 18 has changed.

At a step 524, the fourth upstream endpoint of the fourth TCS 20d (i.e., the first ILA 22a) may receive the third notification signal 402c from the particular one of the ILAs 22 of the fourth TCS 20d (i.e., the second ILA 22b).

At a step 528, in response to receiving the third notification signal 402c, the fourth upstream endpoint of the fourth TCS 20d (i.e., the first ILA 22a) may determine topology information indicative of a topology of the OMS 18. The fourth upstream endpoint of the fourth TCS 20d (i.e., the first ILA 22a) may determine the topology information by initiating a topology discovery process. In some implementations, the fourth upstream endpoint may not receive the third notification signal 402c, but may determine the topology information by initiating a topology discovery process. As nonlimiting examples, the fourth upstream endpoint may determine the topology information by one or more of: initiating a topology discovery process periodically, at reboot, on restoring control plane connectivity, triggered by other factors, and/or manually by a user. The topology information may include line amplifier information indicative of an operational status of the ILAs 22 of the fourth TCS 20d (e.g., whether the OCM 150 of each of the ILAs 22 of the fourth TCS 20d is in the non-monitoring mode or the monitoring mode).

At a step 532, the fourth upstream endpoint of the fourth TCS 20d (i.e., the first ILA 22a) may determine, based on the operational status of the ILAs 22 of the fourth TCS 20d, that the OCM 150 of the particular one of the ILAs 22 of the fourth TCS 20d (i.e., the second ILA 22b) has switched from the monitoring mode to the non-monitoring mode.

At a step 536, the fourth upstream endpoint of the fourth TCS 20d (i.e., the first ILA 22a) may store sixth tilt control information indicative of a sixth TCS 20f. As shown in FIG. 10, the sixth TCS 20f may be a combination of the fourth TCS 20d and the fifth TCS 20e. The sixth TCS 20f may be defined as having the fourth upstream endpoint of the fourth TCS 20*d* (i.e., the first ILA 22*a*) as a sixth upstream endpoint and the fifth downstream endpoint of the fifth TCS 20*e* (i.e., the tail-end network element 14*b*) as a sixth downstream endpoint.

At this stage of the method 500, the transport network 10 (shown in FIG. 11D) includes the second TCS 20*b* having the head-end network element 14*a* as the second upstream endpoint and the first ILA 22*a* as the second downstream endpoint, and the sixth TCS 20*f* having the first ILA 22*a* as sixth third upstream endpoint and the tail-end network element 14*b* as the sixth downstream endpoint. Accordingly, as described in greater detail below, the second upstream endpoint of the second TCS 20*b* (i.e., the head-end network element 14*a*) may be configured to provide tilt control for each of the nodes of the second TCS 20*b*, and the sixth upstream endpoint of the sixth TCS 20*f* (i.e., the first ILA 22*a*) may be configured to provide tilt control for each of the nodes in the sixth TCS 20*f*.

At a step 540, at the direction of the user 30, the user device 34, and/or the network administration device 38, a particular one of the ILAs 22 of the second TCS 20*b* (e.g., the first ILA 22*a*) may cause the OCM 150 of the particular one of the ILAs 22 of the second TCS 20*b* (i.e., the first ILA 22*a*) to switch from the monitoring mode to the non-monitoring mode.

At a step 544, in response to the OCM 150 of the particular one of the ILAs 22 of the second TCS 20*b* (i.e., the first ILA 22*a*) switching from the monitoring mode to the non-monitoring mode, the particular one of the ILAs 22 of the second TCS 20*b* (i.e., the first ILA 22*a*) may send a fourth notification signal 402*d* in an upstream direction toward the second upstream endpoint of the second TCS 20*b* (i.e., the head-end network element 14*a*). The fourth notification signal 402*d* may include a topology information changed notification indicating that a topology of the OMS 18 has changed.

At a step 548, the second upstream endpoint of the second TCS 20*b* (i.e., the head-end network element 14*a*) may receive the fourth notification signal 402*d* from the particular one of the ILAs 22 of the second TCS 20*b* (i.e., the first ILA 22*a*).

At a step 552, in response to receiving the fourth notification signal 402*d*, or for one or more of the reasons previously described, the second upstream endpoint of the second TCS 20*b* (i.e., the head-end network element 14*a*) may determine topology information indicative of a topology of the OMS 18. The second upstream endpoint of the second TCS 20*b* (i.e., the head-end network element 14*a*) may determine the topology information by initiating a topology discovery process. The topology information may include line amplifier information indicative of an operational status of the ILAs 22 of the second TCS 20*b* (e.g., whether the OCM 150 of each of the ILAs 22 of the second TCS 20*b* is in the non-monitoring mode or the monitoring mode).

At a step 556, the second upstream endpoint of the second TCS 20*b* (i.e., the head-end network element 14*a*) may determine, based on the operational status of the ILAs 22 of the second TCS 20*b*, that the OCM 150 of the particular one of the ILAs 22 of the second TCS 20*b* (i.e., the first ILA 22*a*) has switched from the monitoring mode to the non-monitoring mode.

At a step 560, the second upstream endpoint of the second TCS 20*b* (i.e., the head-end network element 14*a*) may store seventh tilt control information indicative of a seventh TCS 20*g*. As shown in FIG. 10, the seventh TCS 20*g* may be a combination of the second TCS 20*b* and the sixth TCS 20*f*. The seventh TCS 20*g* may be defined as having the second upstream endpoint of the second TCS 20*b* (i.e., the head-end network element 14*a*) as a seventh upstream endpoint and the sixth downstream endpoint of the sixth TCS 20*f* (i.e., the tail-end network element 14*b*) as a seventh downstream endpoint.

At this stage of the method 500, the transport network 10 (shown in FIG. 11E) includes the seventh TCS 20*g* having the head-end network element 14*a* as the seventh upstream endpoint and the tail-end network element 14*b* as the seventh downstream endpoint. Accordingly, as described in greater detail below, the seventh upstream endpoint of the seventh TCS 20*g* (i.e., the head-end network element 14*a*) may be configured to provide tilt control for each of the nodes in the seventh TCS 20*g*.

Referring now to FIG. 12, shown therein is a diagrammatic view of another exemplary method 600 of autonomous topology realization for tilt control in accordance with the present disclosure.

As shown in FIG. 12, the method 600 generally comprises the steps of: storing first tilt control information indicative of a first TCS 20*a* having the head-end network element 14*a* as a first upstream endpoint and the tail-end network element 14*b* as a first downstream endpoint (step 604); determining topology information indicative of a topology of the OMS 18, the topology information including line amplifier information indicative of an operational status of the ILAs 22 (step 608); determining that there has been a change in the topology of the OMS 18, such as for example by determining, based on the operational status of the ILAs 22, that the OCM 150 of a first ILA 22*a* of the ILAs 22 has switched from a non-monitoring mode to a monitoring mode (step 612); and storing second tilt control information indicative of a second TCS 20*b* having the head-end network element 14*a* as a second upstream endpoint and the first ILA 22*a* as a second downstream endpoint (step 616).

In some implementations, the method 600 may further comprise the step of receiving a notification signal 402 including a topology information changed notification that a topology of the OMS 18 has changed. In such implementations, the step of determining the topology information indicative of the topology of the OMS 18 (step 608) is further defined as, responsive to receiving the notification signal 402, determining the topology information indicative of the topology of the OMS 18, the topology information including line amplifier information indicative of an operational status of the ILAs 22.

In some implementations, the method 600 may further comprise, prior to determining the topology information indicative of the topology of the OMS 18 (step 608), the steps of: sending an optical signal 300 in a downstream direction toward the downstream endpoint of the first TCS 20*a* (i.e., the tail-end network element 14*b*), the optical signal 300 having a plurality of spectral slices 302, each of the spectral slices 302 of the optical signal 300 having an optical power level; receiving a tilt control signal 406 including tilt information indicating a tilt of the optical signal 300; generating, based on the tilt information, a tilt correction profile, the tilt correction profile including an amount of amplification or attenuation configured to be applied to each of the spectral slices 302 of the optical signal 300 to correct the tilt of the optical signal 300; and sending distributed tilt correction signals 410 in a downstream direction toward the tail-end network element 14*b*, each of the distributed tilt correction signals 410 including a portion of the amount of amplification or attenuation configured to be applied to each of the spectral slices 302 of the optical signal 300 to correct the tilt of the optical signal 300 to be applied at each of the ILAs 22 of the first TCS 20a.

In some implementations, the method 600 may further comprise, subsequent to storing the second tilt control information indicative of the second tilt control section (step 616), the steps of: sending the optical signal 300 in a downstream direction toward the first ILA 22a; receiving a tilt control signal 406 including tilt information indicating a tilt of the optical signal 300; generating, based on the tilt information, a tilt correction profile; and sending one or more distributed tilt correction signals 410 in a downstream direction toward the first ILA 22a, each of the distributed tilt correction profiles including a portion of the amount of amplification or attenuation configured to correct the tilt of the optical signal 300 to be applied at each of the ILAs 22 of the second tilt control section 20b.

In some implementations, the method 600 may further comprise the step of storing third tilt control information indicative of a third TCS 20c having the first ILA 22a as a third upstream endpoint and the tail-end network element 14b as a third downstream endpoint. In some such implementations, the step of storing the third tilt control information indicative of the third TCS 20c is performed by the head-end network element 14a. In other such implementations, the step of storing the third tilt control information indicative of the third TCS 20c is performed by the first ILA 22a.

In some such implementations of the method 600, a second ILA 22b may be positioned between the first ILA 22a and the tail-end network element 14b. In such implementations, the step of determining that the OCM 150 of the first ILA 22a has switched from the non-monitoring mode to the monitoring mode is further defined as determining, based on the operational status of the ILAs 22, that the OCM 150 of the first ILA 22a and the OCM 150 of the second ILA 22b have switched from the non-monitoring mode to the monitoring mode. In such implementations, the step of storing the third tilt control information indicative of the third TCS 20c is performed by the second ILA 22b, the third tilt control information indicative of the third TCS 20c having the second ILA 22b as the third upstream endpoint and the tail-end network element 14b as the third downstream endpoint.

In some such implementations, the method 600 may further comprise the steps of, subsequent to storing the second tilt control information: sending an optical signal 300 in a downstream direction toward the tail-end network element 14b; receiving a tilt control signal 406 including tilt information indicating a tilt of the optical signal 300; generating, based on the tilt information, a tilt correction profile; and sending distributed tilt correction signals 410 in a downstream direction toward the tail-end network element 14b, each of the distributed tilt correction profiles including a portion of the amount of amplification or attenuation configured to correct the tilt of the optical signal 300 to be applied at each of the ILAs 22 of the second TCS 20b.

In other such implementations, the method 600 may further comprise the steps of the second ILA 22b: sending an optical signal 300 in a downstream direction toward the tail-end network element 14b; receiving a tilt control signal 406 including tilt information indicating a tilt of the optical signal 300; generating, based on the tilt information, a tilt correction profile; and sending distributed tilt correction signals 410 in a downstream direction toward the tail-end network element 14b, the distributed tilt correction signals 410 including distributed tilt correction profiles, each of the one or more distributed tilt correction profiles including a portion of the amount of amplification or attenuation configured to correct the tilt of the optical signal 300 to be applied at each of ILAs 22 of the third TCS 20c.

Referring now to FIG. 13, shown therein is a diagrammatic view of another exemplary method 700 of autonomous topology realization for tilt control in accordance with the present disclosure.

As shown in FIG. 13, the method 700 may comprise the steps of: storing first tilt control information indicative of a first TCS 20a having the head-end network element 14a as a first upstream endpoint and the first ILA 22a as a first downstream endpoint (step 704); storing second tilt control information indicative of a second TCS 20b having the first ILA 22a as a second upstream endpoint and the tail-end network element 14b as a second downstream endpoint (step 708); determining topology information indicative of a topology of the OMS 18, the topology information including line amplifier information indicative of an operational status of the ILAs 22 (step 712); determining a change in the topology of the OMS 18 (e.g., determining, based on the operational status of the ILAs 22, that the OCM 150 of the first ILA 22a has switched from a monitoring mode to a non-monitoring mode) (step 716); and storing third tilt control information indicative of a third TCS 20c having the head-end network element 14a as a third upstream endpoint and the tail-end network element 14b as a third downstream endpoint (step 720).

In some implementations, the method 700 may further comprise the step of receiving a notification signal 402 including a topology information changed notification that a topology of the OMS 18 has changed. In such implementations, the step of determining the topology information indicative of the topology of the OMS 18 may be further defined as, responsive to receiving the notification signal 402, determining the topology information indicative of the topology of the OMS 18, the topology information including the line amplifier information indicative of the operational status of the ILAs 22.

In some implementations, the method 700 may further comprise, prior to determining the topology information indicative of the topology of the OMS 18 (step 712), the steps of: sending an optical signal 300 in a downstream direction toward the first ILA 22a; receiving a tilt control signal 406 including tilt information indicating a tilt of the optical signal 300; generating, based on the tilt information, a tilt correction profile; and sending distributed tilt correction signals 410 in a downstream direction toward the first ILA 22a, the distributed tilt correction signals 410 including distributed tilt correction profiles, each of the distributed tilt correction profiles including a portion of the amount of amplification or attenuation configured to correct the tilt of the optical signal 300 to be applied at each of the ILAs 22 of the first TCS 20a.

In some implementations, the method 700 may further comprise the steps of the first ILA 22a: sending an optical signal 300 in a downstream direction toward the tail-end network element 14b; receiving a tilt control signal 406 including tilt information indicating a tilt of the optical signal 300; generating, based on the tilt information, a tilt correction profile; and sending distributed tilt correction signals 410 in a downstream direction toward the tail-end network element 14b, each of the distributed tilt correction profiles including a portion of the amount of amplification or attenuation configured to correct the tilt of the optical signal 300 to be applied at each of the ILAs 22 of the second TCS 20b.

In some implementations of the method 700, a second ILA 22*b* may be positioned between the first ILA 22*a* and the tail-end network element 14*b*, and a third ILA 22*c* may be positioned between the second ILA 22*b* and the tail-end network element 14*b*. In such implementations, the step of storing the second tilt control information (step 708) may be further defined as storing the second tilt control information indicative of the second TCS 20*b* having the first ILA 22*a* as the second upstream endpoint and the second ILA 22*b* as the second downstream endpoint. In such implementations, the method 700 may further comprise, prior to determining the topology information indicative of the topology of the OMS 18 (step 712), the step of: storing fourth tilt control information indicative of a fourth TCS 20*d* having the second ILA 22*b* as a fourth upstream endpoint and the tail-end network element 14*b* as a fourth downstream endpoint. In such implementations, the step of storing the third tilt control information indicative of the third TCS 20*c* (step 720) is further defined as storing the third tilt control information indicative of the third TCS 20*c* having the head-end network element 14*a* as the third upstream endpoint and the second ILA 22*b* as the third downstream endpoint.

In some implementations, the method 700 may further comprise the step of: storing fifth tilt control information indicative of a fifth TCS 20*e* having the third ILA 22*c* as a fifth upstream endpoint and the tail-end network element 14*b* as a fifth downstream endpoint.

In some implementations of the method 700, the second ILA 22*b* may be positioned between the head-end network element 14*a* and the first ILA 22*a*, and the third ILA 22*c* may be positioned between the second ILA 22*b* and the first ILA 22*a*. In such implementations, the step of storing the first tilt control information (step 704) is further defined as storing the first tilt control information indicative of the first TCS 20*a* having the head-end network element 14*a* as the first upstream endpoint and the second ILA 22*b* as the first downstream endpoint. In such implementations, the step of storing the second tilt control information (step 708) is further defined as storing the second tilt control information indicative of the second TCS 20*b* having the first ILA 22*a* as the second upstream endpoint and the tail-end network element 14*b* as the second downstream endpoint. In such implementations, the method 700 may further comprise, prior to determining the topology information indicative of the topology of the OMS 18 (step 712), the step of: storing fourth tilt control information indicative of a fourth TCS 20*d* having the third ILA 22*c* as a fourth upstream endpoint and the first ILA 22*a* as a fourth downstream endpoint. In such implementations, the step of storing the third tilt control information indicative of the third TCS 20*c* (step 720) is further defined as storing the third tilt control information indicative of the third TCS 20*c* having the head-end network element 14*a* as the third upstream endpoint and the second ILA 22*b* as the third downstream endpoint.

In some such implementations, the method 700 may further comprise the step of: storing fifth tilt control information indicative of a fifth TCS 20*e* having the third ILA 22*c* as the third upstream endpoint and the tail-end network element 14*b* as the third downstream endpoint.

Referring now to FIG. 14, shown therein is a diagrammatic view of another exemplary method 800 of autonomous topology realization for tilt control in accordance with the present disclosure.

As shown in FIG. 14, the method 800 generally comprises the head-end network element 14*a* performing the steps of: storing first tilt control information indicative of a first TCS 20*a* having a head-end network element 14*a* acting as an upstream endpoint and a first tail-end network element 14*b* acting as a downstream endpoint, the first TCS 20*a* having a first number of network elements 14 between the head-end network element 14*a* and the first tail-end network element 14*b* (step 804); sending a first optical signal 300 to the first tail-end network element 14*b*, the first optical signal 300 having a plurality of spectral slices 302, each of the plurality of spectral slices 302 having an optical power level (step 808); receiving, from the first tail-end network element 14*b*, tilt information including a measurement of the optical power level of each of the plurality of spectral slices 302 of the first optical signal 300, thereby determining a tilt of the first optical signal 300 (step 812); generating, based on the tilt information, a tilt correction profile, the tilt correction profile including an amount of amplification or attenuation configured to be applied to each of the plurality of spectral slices 302 of the first optical signal 300 to correct (and/or improve) the tilt of the first optical signal 300 (step 816); sending one or more distributed tilt correction signals 410 in a downstream direction toward the first tail-end network element 14*b*, each of the one or more distributed tilt correction signals 410 configured to be received by one of the first number of network elements 14 of the first TCS 20*a*, the one or more distributed tilt correction signals 410 including a first number of distributed tilt correction profiles corresponding to the first number of network elements 14, each of the first number of distributed tilt correction profiles including a portion of the amount of amplification or attenuation configured to be applied to each of the plurality of spectral slices 302 of the first optical signal 300 to correct the tilt of the first optical signal 300 (step 820); determining a change to a topology of the first TCS 20*a* (step 824); storing second tilt control information indicative of a second TCS 20*b* having a second tail-end network element 14*b* different from the first tail-end network element 14*a* and having a second number of network elements 14 between the head-end network element 14*a* and the second tail-end network element 14*b* (step 832); and sending one or more distributed tilt correction signals 410 in a downstream direction toward the second tail-end network element 14*b*, each of the one or more distributed tilt correction signals 410 configured to be received by only the second number of network elements 14 between the head-end network element 14*a* and the second tail-end network element 14*b*, the one or more distributed tilt correction signals 410 including a second number of distributed tilt correction profiles, each of the second number of distributed tilt correction profiles including a portion of the amount of amplification or attenuation configured to be applied to each of the plurality of spectral slices 302 of the first optical signal 300 to correct the tilt of the first optical signal 300 (step 836). As previously described correction of the tilt may include eliminating the tilt and/or improvement of the tilt toward a target power profile and/or a target power profile range.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred implementation. Further, the phrase "based on" is intended to mean "based, at least in part, on" unless explicitly stated otherwise.

What is claimed is:

1. An optical network, comprising:
a head-end network element having a head-end processor, a head-end non-transitory processor-readable medium storing head-end processor-executable instructions, and a head-end optical channel monitor;
a tail-end network element having a tail-end processor, a tail-end non-transitory processor-readable medium storing tail-end processor-executable instructions, and a tail-end optical channel monitor;
an optical multiplex section connecting the head-end network element and the tail-end network element; and
one or more intermediate line amplifiers in the optical multiplex section between the head-end network element and the tail-end network element, at least one of the one or more intermediate line amplifiers having an intermediate optical channel monitor;
wherein the head-end processor-executable instructions, when executed by the head-end processor, cause the head-end processor to:
store first tilt control information indicative of a first tilt control section having the head-end network element as a first upstream endpoint and the tail-end network element as a first downstream endpoint;
determine topology information indicative of a topology of the optical multiplex section, the topology information including line amplifier information indicative of an operational status of the one or more intermediate line amplifiers;
determine, based on the operational status of the one or more intermediate line amplifiers, that the intermediate optical channel monitor of a first intermediate line amplifier of the one or more intermediate line amplifiers has switched from a non-monitoring mode to a monitoring mode; and
store second tilt control information indicative of a second tilt control section having the head-end network element as a second upstream endpoint and the first intermediate line amplifier as a second downstream endpoint.

2. The optical network of claim 1, wherein the head-end processor-executable instructions, when executed by the head-end processor, further cause the head-end processor to:
receive a signal including a topology information changed notification that a topology of the optical multiplex section has changed; and
wherein the step of determining the topology information indicative of the topology of the optical multiplex section is further defined as, responsive to receiving the signal, determining the topology information indicative of the topology of the optical multiplex section, the topology information including the line amplifier information indicative of the operational status of the one or more intermediate line amplifiers.

3. The optical network of claim 1, wherein the head-end processor-executable instructions, when executed by the head-end processor, further cause the head-end processor to, prior to determining the topology information indicative of the topology of the optical multiplex section:
send a first signal in a downstream direction toward the tail-end network element, the first signal having a plurality of spectral slices, each of the plurality of spectral slices having an optical power level;
receive a second signal including tilt information indicating a tilt of the first signal;
generate, based on the tilt information, a tilt correction profile, the tilt correction profile including an amount of amplification or attenuation configured to be applied to each of the plurality of spectral slices of the first signal to correct the tilt of the first signal; and
send one or more distributed third signals in a downstream direction toward the tail-end network element, each of the one or more distributed third signals configured to be received by one of the one or more intermediate line amplifiers of the first tilt control section, the one or more distributed third signals including one or more distributed tilt correction profiles corresponding to the one or more intermediate line amplifiers, each of the one or more distributed tilt correction profiles including a portion of the amount of amplification or attenuation configured to be applied to each of the plurality of spectral slices of the first signal to correct the tilt of the first signal.

4. The optical network of claim 3, wherein the head-end processor-executable instructions, when executed by the head-end processor, further cause the head-end processor to:
determine, based on the line amplifier information, that a faulted intermediate line amplifier of the one or more intermediate line amplifiers of the first tilt control section is faulted; and
change the one or more distributed tilt correction profiles such that the portion of the amount of amplification or attenuation of the one or more distributed tilt correction profiles corresponding to the faulted intermediate line amplifier is distributed among others of the one or more distributed tilt correction profiles.

5. The optical network of claim 1, wherein the head-end processor-executable instructions, when executed by the head-end processor, further cause the head-end processor to, subsequent to storing the second tilt control information indicative of the second tilt control section:
send a first signal in a downstream direction toward the first intermediate line amplifier, the first signal having a plurality of spectral slices, each of the plurality of spectral slices having an optical power level;
receive a signal including tilt information indicating a tilt of the first signal;
generate, based on the tilt information, a tilt correction profile, the tilt correction profile including an amount of amplification or attenuation configured to be applied to each of the plurality of spectral slices of the first signal to correct the tilt of the first signal; and
send one or more distributed third signals in a downstream direction toward the first intermediate line amplifier, each of the one or more distributed third signals configured to be received by one of the one or more intermediate line amplifiers of the second tilt control section, the one or more distributed third signals including one or more distributed tilt correction profiles corresponding to the one or more intermediate line amplifiers, each of the one or more distributed tilt correction profiles including a portion of the amount of amplification or attenuation configured to correct the tilt of the first signal.

6. The optical network of claim 1, wherein the head-end processor-executable instructions, when executed by the head-end processor, further cause the head-end processor to store third tilt control information indicative of a third tilt control section having the first intermediate line amplifier as a third upstream endpoint and the tail-end network element as a third downstream endpoint.

7. The optical network of claim 6, wherein the intermediate optical channel monitor of the first intermediate line amplifier is a first intermediate optical channel monitor, wherein a second intermediate line amplifier of the one or more intermediate line amplifiers has a second intermediate processor, a second intermediate optical channel monitor, and a second intermediate non-transitory processor-readable medium storing second intermediate processor-executable instructions, wherein the step of determining that the first intermediate optical channel monitor has switched from a non-monitoring mode to a monitoring mode is further defined as determining, based on the operational status of the one or more intermediate line amplifiers, that the first intermediate optical channel monitor of the first intermediate line amplifier and the second intermediate optical channel monitor of the second intermediate line amplifier have switched from a non-monitoring mode to a monitoring mode, the second intermediate line amplifier positioned between the first intermediate line amplifier and the tail-end network element, and wherein the step of storing the third tilt control information is further defined as the second intermediate processor-executable instructions, when executed by the second intermediate processor, causing the second intermediate processor to:
    store the third tilt control information indicative of the third tilt control section having the second intermediate line amplifier as the third upstream endpoint and the tail-end network element as the third downstream endpoint.

8. The optical network of claim 7, wherein the head-end processor-executable instructions, when executed by the head-end processor, further cause the head-end processor to, subsequent to storing the second tilt control information indicative of the second tilt control section:
    send a first signal in a downstream direction toward the first intermediate line amplifier, the first signal having a plurality of spectral slices, each of the plurality of spectral slices having an optical power level;
    receive a signal including tilt information indicating a tilt of the first signal;
    generate, based on the tilt information, a tilt correction profile, the tilt correction profile including an amount of amplification or attenuation configured to be applied to each of the plurality of spectral slices of the first signal to correct the tilt of the first signal; and
    send one or more distributed third signals in a downstream direction toward the first intermediate line amplifier, each of the one or more distributed third signals configured to be received by one of the one or more intermediate line amplifiers of the second tilt control section, the one or more distributed third signals including one or more distributed tilt correction profiles corresponding to the one or more intermediate line amplifiers, each of the one or more distributed tilt correction profiles including a portion of the amount of amplification or attenuation configured to correct the tilt of the first signal.

9. The optical network of claim 7, wherein the second intermediate line amplifier further has an intermediate processor and an intermediate non-transitory processor-readable medium storing intermediate processor-executable instructions, wherein the intermediate processor-executable instructions, when executed by the intermediate processor, cause the intermediate processor to:
    send a first signal in a downstream direction toward the tail-end network element, the first signal having a plurality of spectral slices, each of the plurality of spectral slices having an optical power level;
    receive a signal including tilt information indicating a tilt of the first signal;
    generate, based on the tilt information, a tilt correction profile, the tilt correction profile including an amount of amplification or attenuation configured to be applied to each of the plurality of spectral slices of the first signal to correct the tilt of the first signal; and
    send one or more distributed third signals in a downstream direction toward the tail-end network element, each of the one or more distributed third signals configured to be received by one of the one or more intermediate line amplifiers of the third tilt control section, the one or more distributed third signals including one or more distributed tilt correction profiles corresponding to the one or more intermediate line amplifiers, each of the one or more distributed tilt correction profiles including a portion of the amount of amplification or attenuation configured to correct the tilt of the first signal.

10. An optical network, comprising:
a head-end network element having a head-end processor, a head-end non-transitory processor-readable medium storing head-end processor-executable instructions, and a head-end optical channel monitor;
a tail-end network element having a tail-end processor, a tail-end non-transitory processor-readable medium storing tail-end processor-executable instructions, and a tail-end optical channel monitor;
an optical multiplex section connecting the head-end network element and the tail-end network element; and
one or more intermediate line amplifiers in the optical multiplex section between the head-end network element and the tail-end network element, a first intermediate line amplifier of the one or more intermediate line amplifiers having an intermediate optical channel monitor;
wherein the head-end processor-executable instructions, when executed by the head-end processor, cause the head-end processor to:
    store first tilt control information indicative of a first tilt control section having the head-end network element as a first upstream endpoint and the first intermediate line amplifier as a first downstream endpoint;
    store second tilt control information indicative of a second tilt control section having the first intermediate line amplifier as a second upstream endpoint and the tail-end network element as a second downstream endpoint;
    determine topology information indicative of a topology of the optical multiplex section, the topology information including line amplifier information indicative of an operational status of the one or more intermediate line amplifiers;
    determine, based on the operational status of the one or more intermediate line amplifiers, that the intermediate optical channel monitor of the first intermediate line amplifier has switched from a monitoring mode to a non-monitoring mode; and store third tilt control information indicative of a third tilt control section having the head-end network element as a third upstream endpoint and the tail-end network element as a third downstream endpoint.

11. The optical network of claim 10, wherein the head-end processor-executable instructions, when executed by the head-end processor, cause the head-end processor to:

receive a signal including a topology information changed notification that a topology of the optical multiplex section has changed; and wherein the step of determining the topology information indicative of the topology of the optical multiplex section is further defined as, responsive to receiving the signal, determining the topology information indicative of the topology of the optical multiplex section, the topology information including the line amplifier information indicative of the operational status of the one or more intermediate line amplifiers.

12. The optical network of claim 10, wherein the head-end processor-executable instructions, when executed by the head-end processor, further cause the head-end processor to, prior to determining the topology information indicative of the topology of the optical multiplex section:

send a first signal in a downstream direction toward the first intermediate line amplifier, the first signal having a plurality of spectral slices, each of the plurality of spectral slices having an optical power level;

receive a signal including tilt information indicating a tilt of the first signal;

generate, based on the tilt information, a tilt correction profile, the tilt correction profile including an amount of amplification or attenuation configured to be applied to each of the plurality of spectral slices of the first signal to correct the tilt of the first signal; and send one or more distributed third signals in a downstream direction toward the first intermediate line amplifier, each of the one or more distributed third signals configured to be received by one of the one or more intermediate line amplifiers of the first tilt control section, the one or more distributed third signals including one or more distributed tilt correction profiles corresponding to the one or more intermediate line amplifiers, each of the one or more distributed tilt correction profiles including a portion of the amount of amplification or attenuation configured to correct the tilt of the first signal.

13. The optical network of claim 12, wherein the head-end processor-executable instructions, when executed by the head-end processor, further cause the head-end processor to:

determine, based on the line amplifier information, that a faulted intermediate line amplifier of the one or more intermediate line amplifiers of the first tilt control section is faulted; and change the one or more distributed tilt correction profiles such that the portion of the amount of amplification or attenuation of the one or more distributed tilt correction profiles corresponding to the faulted intermediate line amplifier is distributed among others of the one or more distributed tilt correction profiles of the one or more distributed third signals.

14. The optical network of claim 10, wherein the first intermediate line amplifier further has an intermediate processor and an intermediate non-transitory processor-readable medium storing intermediate processor-executable instructions, wherein the intermediate processor-executable instructions, when executed by the intermediate processor, cause the intermediate processor to:

send a first signal in a downstream direction toward the tail-end network element, the first signal having a plurality of spectral slices, each of the plurality of spectral slices having an optical power level;

receive a signal including tilt information indicating a tilt of the first signal;

generate, based on the tilt information, a tilt correction profile, the tilt correction profile including an amount of amplification or attenuation configured to be applied to each of the plurality of spectral slices of the first signal to correct the tilt of the first signal; and send one or more distributed third signals in a downstream direction toward the tail-end network element, each of the one or more distributed third signals configured to be received by one of the one or more intermediate line amplifiers of the second tilt control section, the one or more distributed third signals including one or more distributed tilt correction profiles corresponding to the one or more intermediate line amplifiers, each of the one or more distributed tilt correction profiles including a portion of the amount of amplification or attenuation configured to correct the tilt of the first signal.

15. The optical network of claim 14, wherein the intermediate processor-executable instructions, when executed by the intermediate processor, further cause the intermediate processor to:

determine, based on the line amplifier information, that a faulted intermediate line amplifier of the one or more intermediate line amplifiers of the second tilt control section is faulted; and change the one or more distributed tilt correction profiles such that the portion of the amount of amplification or attenuation of the one or more distributed tilt correction profiles corresponding to the faulted intermediate line amplifier is distributed among others of the one or more distributed tilt correction profiles.

16. The optical network of claim 10, wherein the intermediate optical channel monitor of the first intermediate line amplifier is a first intermediate optical channel monitor, wherein a second intermediate line amplifier of the one or more intermediate line amplifiers has a second intermediate optical channel monitor and a third intermediate line amplifier of the one or more intermediate line amplifiers has a third intermediate optical channel monitor, the second intermediate line amplifier positioned in the optical multiplex section between the first intermediate line amplifier and the tail-end network element, the third intermediate line amplifier positioned in the optical multiplex section between the second intermediate line amplifier and the tail-end network element, wherein the step of storing the second tilt control information is further defined as storing the second tilt control information indicative of the second tilt control section having the first intermediate line amplifier as the second upstream endpoint and the second intermediate line amplifier as the second downstream endpoint, and wherein the head-end processor-executable instructions, when executed by the head-end processor, further cause the head-end processor to:

prior to determining the topology information indicative of the topology of the optical multiplex section, store fourth tilt control information indicative of a fourth tilt control section having the third intermediate line amplifier as a fourth upstream endpoint and the tail-end network element as a fourth downstream endpoint; and wherein the step of storing the third tilt control information indicative of the third tilt control section is further defined as storing the third tilt control information indicative of the third tilt control section having the head-end network element as the third upstream endpoint and the second intermediate line amplifier as the third downstream endpoint.

17. The optical network of claim 16, wherein the head-end processor-executable instructions, when executed by the head-end processor, further cause the head-end processor to store fifth tilt control information indicative of a fifth tilt control section having the third intermediate line amplifier as a fifth upstream endpoint and the tail-end network element as a fifth downstream endpoint.

18. The optical network of claim 10, wherein the intermediate optical channel monitor of the first intermediate line amplifier is a first intermediate optical channel monitor, wherein a second intermediate line amplifier of the one or more intermediate line amplifiers has a second intermediate optical channel monitor and a third intermediate line amplifier of the one or more intermediate line amplifiers has a third intermediate optical channel monitor, the second intermediate line amplifier positioned in the optical multiplex section between the head-end network element and the first intermediate line amplifier, the third intermediate line amplifier positioned in the optical multiplex section between the second intermediate line amplifier and the first intermediate line amplifier, wherein the step of storing the first tilt control information is further defined as storing the first tilt control information indicative of the first tilt control section having the head-end network element as the first upstream endpoint and the second intermediate line amplifier as the first downstream endpoint, wherein the step of storing the second tilt control information is further defined as storing the second tilt control information indicative of the second tilt control section having the first intermediate line amplifier as the second upstream endpoint and the tail-end network element as the second downstream endpoint, and wherein the head-end processor-executable instructions, when executed by the head-end processor, further cause the head-end processor to:

prior to determining the topology information indicative of the topology of the optical multiplex section, store fourth tilt control information indicative of a fourth tilt control section having the third intermediate line amplifier as a fourth upstream endpoint and the first intermediate line amplifier as a fourth downstream endpoint; and wherein the step of storing the third tilt control information indicative of the third tilt control section is further defined as storing the third tilt control information indicative of the third tilt control section having the head-end network element as the third upstream endpoint and the second intermediate line amplifier as the third downstream endpoint.

19. The optical network of claim 18, wherein the head-end processor-executable instructions, when executed by the head-end processor, further cause the head-end processor to store fifth tilt control information indicative of a fifth tilt control section having the third intermediate line amplifier as a fifth upstream endpoint and the tail-end network element as a fifth downstream endpoint.

20. A network element in an optical network, comprising:
a head-end processor; and a head-end non-transitory processor-readable medium storing head-end processor-executable instructions that when executed cause the head-end processor to:

store first tilt control information indicative of a first tilt control section having the network element as a head-end network element acting as an upstream endpoint and a first tail-end network element acting as a downstream endpoint, the first tilt control section having a first number of network elements between the head-end network element and the first tail-end network element;

send a first signal to the first tail-end network element, the first signal having a plurality of spectral slices, each of the plurality of spectral slices having an optical power level;

receive, from the first tail-end network element, tilt information including a measurement of the optical power level of each of the plurality of spectral slices of the first signal, thereby determining a tilt of the first signal;

generate, based on the tilt information, a tilt correction profile, the tilt correction profile including an amount of amplification or attenuation configured to be applied to each of the plurality of spectral slices of the first signal to correct the tilt of the first signal;

send one or more distributed second signals in a downstream direction toward the first tail-end network element, each of the one or more distributed second signals configured to be received by one of the first number of network elements of the first tilt control section, the one or more distributed second signals including a first number of distributed tilt correction profiles corresponding to the first number of network elements, each of the first number of distributed tilt correction profiles including a portion of the amount of amplification or attenuation configured to be applied to each of the plurality of spectral slices of the first signal to correct the tilt of the first signal;

determine a change to a topology of the first tilt control section;

store second tilt control information indicative of a second tilt control section having a second tail-end network element different from the first tail-end network element and having a second number of network elements between the head-end network element and the second tail-end network element; and send one or more distributed third signals in a downstream direction toward the second tail-end network element, each of the one or more distributed third signals configured to be received by only the second number of network elements between the head-end network element and the second tail-end network element, the one or more distributed third signals including a second number of distributed tilt correction profiles, each of the second number of distributed tilt correction profiles including a portion of the amount of amplification or attenuation configured to be applied to each of the plurality of spectral slices of the first signal to correct the tilt of the first signal.

* * * * *